United States Patent
Zhang et al.

(10) Patent No.: US 11,057,140 B2
(45) Date of Patent: Jul. 6, 2021

(54) METHOD FOR TRANSMITTING SIGNAL, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhi Zhang, Dongguan (CN); Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/494,258

(22) PCT Filed: May 5, 2017

(86) PCT No.: PCT/CN2017/083245
§ 371 (c)(1),
(2) Date: Sep. 13, 2019

(87) PCT Pub. No.: WO2018/166053
PCT Pub. Date: Sep. 20, 2018

(65) Prior Publication Data
US 2020/0136738 A1    Apr. 30, 2020

(30) Foreign Application Priority Data
Mar. 15, 2017   (WO) ............... PCT/CN2017/076856

(51) Int. Cl.
*H04J 11/00*      (2006.01)
*H04W 76/27*   (2018.01)
(Continued)

(52) U.S. Cl.
CPC ....... *H04J 11/0073* (2013.01); *H04J 11/0076* (2013.01); *H04J 11/0079* (2013.01);
(Continued)

(58) Field of Classification Search
CPC .............. H04J 11/0073; H04J 11/0076; H04J 11/0079; H04W 76/27; H04W 56/001;
(Continued)

(56) References Cited

U.S. PATENT DOCUMENTS 8,446,869 B2   5/2013   Lee
8,548,086 B2   10/2013  Lo
(Continued)

FOREIGN PATENT DOCUMENTS

CN   1220801 A    6/1999
CN   102461269 A  5/2012
(Continued)

OTHER PUBLICATIONS

Huawei Hisilicon ZTE ZTE Microelectronics ITL Motorola: "WF on SS burst set composition and SS-block Index Indication", 3GPP Draft; R1-1703832 WF on SS Burst Set Composition and SS-Block Index Indication_V4, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Jan. 13, 2017-Jan. 17, 2017 Feb. 16, 2017 (Feb. 16, 2017), XP051236632.
(Continued)

*Primary Examiner* — Walter J Divito
(74) *Attorney, Agent, or Firm* — Ladas & Parry, LLP

(57) ABSTRACT

Disclosed are a method for transmitting a signal, a terminal device and a network device. The method comprises: a terminal device determining a time domain position, in a first transmission cycle, of a synchronization signal block burst of a cell where the terminal device is located; and the terminal device receiving, according to the time domain position of the synchronization signal block burst in the first transmission cycle, a synchronization signal block sent by a network device. The method, the terminal device and the (Continued)

network device in the embodiments of the prevent application can reduce the computation complexity of the terminal device, reduce the detection time and save on the power consumption.

10 Claims, 19 Drawing Sheets

(51) Int. Cl.
  *H04W 56/00* (2009.01)
  *H04W 72/04* (2009.01)
(52) U.S. Cl.
  CPC ....... *H04W 56/001* (2013.01); *H04W 72/042* (2013.01); *H04W 76/27* (2018.02); *H04W 72/0446* (2013.01)
(58) Field of Classification Search
  CPC ........... H04W 72/042; H04W 72/0446; H04W 56/0015; H04W 52/0216; Y02D 30/70
  See application file for complete search history.

(56) References Cited

U.S. PATENT DOCUMENTS

| 9,025,650 | B2 | 5/2015 | Lo et al. |
| 2010/0260156 | A1 | 10/2010 | Lee |
| 2013/0202019 | A1 | 8/2013 | Lo |
| 2014/0029656 | A1 | 1/2014 | Lo et al. |
| 2015/0244554 | A1 | 8/2015 | Lo et al. |
| 2016/0007307 | A1 | 1/2016 | Wei et al. |
| 2016/0316431 | A1 | 10/2016 | Zhu et al. |
| 2018/0084593 | A1 | 3/2018 | Chen et al. |
| 2018/0227935 | A1 | 8/2018 | Zhou et al. |
| 2019/0173719 | A1 | 6/2019 | Qin et al. |
| 2019/0182782 | A1 | 6/2019 | Wang et al. |
| 2019/0373570 | A1 | 12/2019 | Yokomakura et al. |
| 2020/0015197 | A1* | 1/2020 | Harada ............. H04W 72/0453 |
| 2020/0245228 | A1 | 7/2020 | Rune et al. |

FOREIGN PATENT DOCUMENTS

| CN | 104955106 | A | 9/2015 |
| CN | 105052178 | A | 11/2015 |
| CN | 105682214 | A | 6/2016 |
| CN | 105703869 | A | 6/2016 |
| CN | 106455040 | A | 2/2017 |
| EP | 0906621 | A2 | 4/1999 |
| EP | 3079385 | A1 | 10/2016 |
| RU | 2409896 | C2 | 1/2011 |
| WO | 0072600 | A2 | 11/2000 |
| WO | 2010071233 | A1 | 6/2010 |

OTHER PUBLICATIONS

Supplementary European Search Report in the European application No. 17900576.4, dated Jan. 30, 2020.
Supplementary European Search Report in the European application No. 17900440.3, dated Feb. 12, 2020.
English translation of the Written Opinion of the International Search Authority in the international application No. PCT/CN2017/076856, dated Dec. 5, 2017.
English translation of the Written Opinion of the International Search Authority in the international application No. PCT/CN2017/083245, dated Nov. 7, 2017.
International Search Report in the international application No. PCT/CN2017/083245, dated Nov. 7, 2017.
Written Opinion of the International Search Authority in the international application No. PCT/CN2017/083245, dated Nov. 7, 2017 and English translation provided by Google Translate.
International Search Report in the international application No. PCT/CN2017/076856, dated Dec. 5, 2017.
Written Opinion of the International Search Authority in the international application No. PCT/CN2017/076856, dated Dec. 5, 2017 and English translation provided by Google Translate.
Guangdong OPPO Mobile Telecom, Discussion on multi-beam based initial access for NR, Discussion and Decision, 3GPP TSG RAN WG1 Meeting #87, R1-1611701, Nov. 14-18, 2016.
Qualcomm Incorporated, Multi-beam Sync design, Discussion, 3GPP TSG RAN WG1 Meeting #87 R1-1612024, Nov. 14-18, 2016.
Notice of Allowance of the Russian application No. 2019132693, dated Jul. 28, 2020.
Intel Corporation, On NR initial access and mobility, Discussion and Decision, 3GPP TSG RAN WG1 Meeting #87 R1-1611969, Nov. 14-18, 2016.
Ericsson, NR synchronization signal bandwidth and multiplexing, Discussion, Decision, 3GPP TSG-RAN WG1 NR adhoc R1-1700292, Jan. 16-20, 2017.
First Office Action of the Chilean application No. 201902618, dated Aug. 27, 2020.
Guangdong Oppo Mobile Telecom: "Discussion on SS block related design for NR", 3GPP Draft; R1-1701937, 3rd Generation Partnership Project (3GPP), Mobile Competence Centre; 650, Route Des Lucioles: F-06921 Sophia-Antipolis Cedex; France, vol. RAN WG1, No. Athens, Greece; Feb. 13, 2017-Feb. 17, 2017 Feb. 12, 2017 (Feb. 12, 2017), XP051209099.
First Office Action of the European application No. 17900440.3, dated Oct. 7, 2020.
Pre-Interview Communication of the U.S. Appl. No. 16/494,263, dated Dec. 28, 2020.
First Office Action of the European application No. 17900576.4, dated Nov. 6, 2020.
Office Action of the Indian application No. 201917039182, dated Dec. 14, 2020.
First Office Action of the Canadian application No. 3056265, dated Oct. 22, 2020.
ITL; "On NR-SS structure and time indexing", 3GPP Draft; R1-1703422, 3GPP, Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, section 2.1.
First Office Action of the Chinese application No. 201911308537.3, dated Nov. 2, 2020.
Samsung, SS burst set composition and time index indication[online], 3GPP TSG RAN WG1#88 R1-1702901, Feb. 17, 2017.
ZTE, ZTE Microelectronics, Design of SS burst set and SS block index[online], 3GPP TSG RAN WG1#88 R1-1701573, Feb. 17, 2017.
Motorola Mobility, Lenovo, Numerology and structure for NR synchronization signal[online], 3GPP TSG RAN WG1#88R1-1703043, Feb. 17, 2017.
Guangdong OPPO Mobile Telecom, Discussion on design of SS block[online], 3GPP TSG RAN WG1#89 R1-1707691. Internet<URL:http://www.3gpp.org/ftp/tsg_ran/WG1_RL1/TSGR1_89/Docs/R1-1707691.zip>, May 6, 2017.
Second Office Action of the Chilean application No. 201902618, dated Feb. 1, 2021.
Office Action of the Indian application No. 201917041390, dated Feb. 24, 2021.
First Office Action of the Japanese application No. 2019-550631, dated Mar. 16, 2021.
Second Office Action of the European application No. 17900440.3, dated Mar. 24, 2021.
First Action Interview Office Action of the U.S. Appl. No. 16/494,263, dated Mar. 22, 2021.
3GPP TSG-RAN WG1 Meeting #88 R1-1703092, Athens, Greece Feb. 13-17, 2017, Agenda item: 8.1.1.1.2; Source: Nokia, Alcatel-Lucent Shanghai Bell; Title: On Requirements and Design of SS Burst Set and SS Block Index Indication.
3GPP TSG RAN WG1 Meeting #88 R1-1703353, Athens, Greece, Feb. 13-17, 2017, Agenda Item: 8.1.1.1.2 Source: Huawei, HiSilicon; Title: Discussion on SS burst set composition and SS block time index indication.

(56) References Cited

OTHER PUBLICATIONS

First Office Action of the Chinese application No. 201911308816.X, dated Apr. 28, 2021.
Qualcomm Incorporated, SS burst composition and time index indication considerations, 3GPP TSG RAN WG1 #88 R1-1702585, Feb. 7, 2017.
NTT Docomo, Inc., Discussion on SS burst set composition and SS block index indication for NR, 3GPP TSG RAN WG1 #88 R1-1702823, Feb. 7, 2017.
CATT, SS Burst Set and SS Block Configuration, 3GPP TSG RAN WG1 #88 R1-1702058, Feb. 7, 2017.
First Office Action of the Japanese application No. 2019-549509, dated May 21, 2021.

* cited by examiner

METHOD FOR TRANSMITTING SIGNAL, TERMINAL DEVICE AND NETWORK DEVICE

CROSS-REFERENCE TO RELATED APPLICATION

The present application is the U.S. national phase application of PCT Application No. PCT/CN2017/083245 filed on May 5, 2017 and claims priority of PCT Application No. PCT/CN2017/076856, filed on Mar. 15, 2017 and entitled "Signal Transmission Method, Terminal Device and Network Device", the contents of which are hereby incorporated by reference in their entireties.

TECHNICAL FIELD

Embodiments of the application relate to the field of communications, and more particularly to a signal transmission method, a terminal device and a network device.

BACKGROUND

A multi-beam system covers a whole cell through different beams, that is, each beam covers a relatively small range, and an effect of covering the whole cell by use of multiple beams is achieved by time sweeping. Different synchronization signal (SS) blocks are transmitted on some different beams, multiple SS blocks in an SS cycle are combined into an SS block burst, and multiple SS block bursts form an SS burst set. A terminal device intended to obtain a condition of multiple SS blocks usually has to perform detection in a whole SS cycle, which causes long detection time and high power consumption.

SUMMARY

In view of this, the embodiments of the application provide a signal transmission method, a terminal device and a network device, which facilitate reduction in calculation complexity of the terminal device, reduction in detection time and reduction in power consumption.

A first aspect provides a signal transmission method, which includes that: a timing sequence of each of multiple SS blocks in a first cycle is determined; and each of the multiple SS blocks is received based on the timing sequence of the respective SS block in the first cycle.

Herein, the timing sequence of the SS block may be a time-domain resource taken by the SS block, and may take time-domain unit as a unit.

In addition, the multiple SS blocks may be all or part of SS blocks of a cell, or may include all or part of SS blocks of a neighbor cell of a present cell accessed by a terminal device.

If the multiple SS blocks are different SS blocks of the same cell, a time length of the first cycle may be equal to a transmission cycle of any SS block in the cell. Herein, different SS blocks may mean that different beams are adopted for the SS blocks, or may mean that the SS blocks include different signal types or signal contents. In other words, the time length of the first cycle may also be equal to a transmission cycle of the same beam.

The terminal device may determine the timing sequences of the multiple SS blocks in the cycle in advance, and then may receive the SS blocks on fixed time-domain resources, so that the terminal device may greatly reduce calculation complexity, reduce detection time and reduce power consumption.

A second aspect provides a signal transmission method, which may include that, a terminal device determines a time-domain position of an SS block burst of a serving cell of the terminal device in a first transmission cycle; and the terminal device receives an SS block from a network device based on the time-domain position of the SS block burst in the first transmission cycle.

The terminal device may determine the time-domain position of the SS block burst of the serving cell of the terminal device in the transmission cycle in advance, and then may receive the SS block on a fixed time-domain resource, so that the terminal device may greatly reduce calculation complexity, reduce detection time and reduce power consumption.

In a possible implementation mode, the operation that the terminal device determines the time-domain position of the SS block burst of the serving cell of the terminal device in the first transmission cycle may include that, the terminal device determines the time-domain position of the SS block burst in the first transmission cycle based on a physical cell identity (PCI) of the serving cell of the terminal device.

Alternatively, the network device may predetermine a mapping relationship between a PCI and a time-domain position of an SS block burst together with the terminal device. The network device may make PCIs of neighbor cells corresponding to different time-domain positions of the SS block burst.

Alternatively, the network device may adopt a calculation rule to map all or part of the PCIs to possible time-domain positions of the SS block burst and notify this calculation rule to the terminal device, and the terminal device, when acquiring the PCI of the serving cell of the terminal device, may calculate the time-domain position where it is required to detect the SS block based on the preset rule.

In a possible implementation mode, the operation that the terminal device determines the time-domain position of the SS block burst in the first transmission cycle based on the PCI of the serving cell of the terminal device may include that: the terminal device determines a target time-domain offset of the SS block burst relative to a first position in the first transmission cycle based on the PCI; and the terminal device determines the time-domain position of the SS block burst in the first transmission cycle based on the target time-domain offset.

A time-domain offset may be understood as an offset of an SS block burst of a certain cell relative to a starting position of a certain transmission cycle in time domain.

The network device adopts a certain rule to design time-domain offsets of SS blocks of different cells, so that interference between the cells may be reduced.

In a possible implementation mode, the operation that the terminal device determines the target time-domain offset of the SS block burst relative to the first position in the first transmission cycle based on the PCI may include that: the terminal device determines the target time-domain offset based on the PCI and a mapping relationship between PCIs and time-domain offsets.

In a possible implementation mode, the method may further include that: the terminal device receives first information from the network device; and the operation that the terminal device determines the target time-domain offset of the SS block burst relative to the first position in the first transmission cycle based on the PCI may include that: the terminal device determines the target time-domain offset based on the PCI and the first information.

In a possible implementation mode, the first information may be the number of SS blocks in the burst or timing sequence information of the SS block burst in the first transmission cycle, and the operation that the terminal device determines the target time-domain offset based on the PCI and the first information may include that: the terminal device determines the target time-domain offset based on the PCI and the number of the SS blocks in the burst; or the terminal device determines the target time-domain offset based on the PCI and the timing sequence information of the SS block burst in the first transmission cycle.

Alternatively, the network device may also configure the mapping relationship between the PCI and the time-domain offset in advance. Or the network device and the terminal device predetermine a rule, and the PCI may be calculated based on the rule to obtain the corresponding time-domain offset thereof.

In a possible implementation mode, the operation that the terminal device determines the target time-domain offset based on the PCI and the number of the SS blocks in the burst may include that: the terminal device executes a remainder operation on the PCI and the number of the SS blocks in the burst to obtain the target time-domain offset.

Alternatively, the method further includes that: the terminal device receives a first SS block in the SS block burst from the network device, and the terminal device determines the PCI of the serving cell of the terminal device based on the first SS block; and the operation that the terminal device receives the SS from the network device based on the time-domain offset includes that: the terminal device receives a second SS block in the SS block burst from the network device based on the time-domain offset.

In a possible implementation mode, the method may further include that: the terminal device receives second information from the network device, the second information indicates the target time-domain offset of the SS block burst in the first transmission cycle; and the operation that the terminal device determines the time-domain position of the SS block burst of the serving cell of the terminal device in the first transmission cycle may include that: the terminal device determines the target time-domain offset based on the second information, and the terminal device determines the time-domain position of the SS block burst in the first transmission cycle based on the target time-domain offset.

The network device directly tells the terminal device the determined time-domain offset or replaces the PCI with information about the determined time-domain offset, so that system flexibility may be improved, and an added burden for PCI optimization may be reduced.

In a possible implementation mode, the second information may be an Identity (ID) of the target time-domain offset, and the operation that the terminal device determines the target time-domain offset based on the second information may include that: the terminal device determines the target time-domain offset in multiple pre-configured time-domain offsets based on the ID of the target time-domain offset.

In a possible implementation mode, the first information and the second information may be carried in a system message, a broadcast message or Radio Resource Control (RRC) signaling.

In a possible implementation mode, the operation that the terminal device determines the time-domain position of the SS block burst of the serving cell of the terminal device in the first transmission cycle may include that: the terminal device receives a first SS block in the SS block burst from the network device, and the terminal device determines the time-domain position of the SS block burst in the first transmission cycle based on a time-domain position of the first SS block in the first transmission cycle and the timing sequence information of the SS block burst in the first transmission cycle; and the operation that the terminal device receives the SS block from the network device based on the time-domain position of the SS block burst in the first transmission cycle may include that: the terminal device receives a second SS block in the SS block burst from the network device based on the time-domain position of the SS block burst in the first transmission cycle.

In a possible implementation mode, the timing sequence information may include the number of time-domain units spacing any two adjacent SS blocks in the SS block burst, and the method may further include that: the terminal device receives indication information from the network device, the indication information indicates the number of the time-domain units; and the operation that the terminal device determines the time-domain position of the SS block burst in the first transmission cycle based on the time-domain position of the first SS block in the first transmission cycle and the timing sequence information of the SS block burst in the first transmission cycle may include that: the terminal device determines the time-domain position of the SS block burst in the first transmission cycle based on the time-domain position of the first SS block in the first transmission cycle and the number of the time-domain units.

Herein, the time-domain unit may be an Orthogonal Frequency Division Multiplexing (OFDM) symbol, and may also be a slot, a mini-slot and the like.

In a possible implementation mode, the method may further include that: the terminal device receives the indication information from the network device, the indication information indicates the number of the SS blocks in the burst; and the operation that the terminal device determines the time-domain position of the SS block burst of the serving cell of the terminal device in the first transmission cycle may include that: the terminal device determines the time-domain position of the SS block burst in the first transmission cycle based on the number of the SS blocks in the burst.

In a possible implementation mode, the method may further include that: the terminal device receives the indication information from the network device, the indication information indicates the time-domain position of the SS block burst in the first transmission cycle; and the operation that the terminal device determines the time-domain position of the SS block burst of the serving cell of the terminal device in the first transmission cycle may include that: the terminal device determines the time-domain position of the SS block burst in the first transmission cycle based on the indication information.

In a possible implementation mode, the method may further include that: the terminal device receives the indication information from the network device, the indication information indicates a first correspondence in multiple correspondences, and the correspondence is a mapping of a timing sequence the SS block burst in the first transmission cycle; and the operation that the terminal device determines the time-domain position of the SS block burst of the serving cell of the terminal device in the first transmission cycle may include that: the terminal device determines the time-domain position of the SS block burst in the first transmission cycle based on the first correspondence.

In a possible implementation mode, the indication information may be carried in at least one of the broadcast message, the system message, the RRC signaling, media access control (MAC) control element (CE) signaling, or downlink control information (DCI).

In a possible implementation mode, the operation that the terminal device receives the indication information from the network device may include that: the terminal device receives the indication information from the network device on a primary carrier.

In a possible implementation mode, the primary carrier may be a carrier in a New Radio (NR) or Long Term Evolution (LTE) system.

In a possible implementation mode, the SS block may mainly include a Primary Synchronization Signal (PSS) and a Secondary Synchronization Signal (SSS), and some SS blocks may further include a Physical Broadcast Channel (PBCH) and may even include a Demodulation Reference Signal (DMS) for demodulating the PBCH.

A third aspect provides a signal transmission method, which includes that: indication information is sent to a terminal device, the indication information is used for the terminal device to determine a timing sequence of each of multiple SS blocks in a first cycle; and the multiple SS blocks are sent to the terminal device based on the timing sequence of each SS block in the first cycle.

The timing sequences of the multiple SS blocks in the cycle are indicated to the terminal device, so that the terminal device may greatly reduce calculation complexity, reduce detection time and reduce power consumption.

A fourth aspect provides a signal transmission method, which may include that: a network device determines a time-domain position of an SS block burst of a first cell in a first transmission cycle; and the network device sends an SS block to a terminal device in the first cell based on the time-domain position of the SS block burst in the first transmission cycle.

The network device sends the SS block on a fixed time-domain resource, and then the terminal device may receive the SS block on the fixed time-domain resource, so that the terminal device may greatly reduce calculation complexity, reduce detection time and reduce power consumption.

In a possible implementation mode, the operation that the network device determines the time-domain position of the SS block burst of the first cell in the first transmission cycle may include that: the network device determines the time-domain position of the SS block burst in the first transmission cycle based on a PCI of the first cell.

In a possible implementation mode, the operation that the network device determines the time-domain position of the SS block burst in the first transmission cycle based on the PCI of the first cell may include that: the network device determines a target time-domain offset of the SS block burst relative to a first position in the first transmission cycle based on the PCI; and the network device determines the time-domain position of the SS block burst in the first transmission cycle based on the target time-domain offset.

In a possible implementation mode, the operation that the network device determines the target time-domain offset of the SS block burst relative to the first position in the first transmission cycle based on the PCI may include that: the network device determines the target time-domain offset based on the PCI and first information.

In a possible implementation mode, the operation that the network device determines the target time-domain offset of the SS block burst relative to the first position in the first transmission cycle based on the PCI may include that: the network device determines the target time-domain offset based on the PCI and first information.

In a possible implementation mode, the first information may be the number of the SS blocks in the burst or timing sequence information of the SS block burst in the first transmission cycle, and the operation that the network device determines the target time-domain offset based on the PCI and the first information may include that: the network device determines the target time-domain offset based on the PCI and the number of the SS blocks in the burst; or the network device determines the target time-domain offset based on the PCI and the timing sequence information of the SS block burst in the first transmission cycle.

In a possible implementation mode, the operation that the network device determines the target time-domain offset based on the PCI and the number of the SS blocks in the burst may include that: the network device executes a remainder calculation operation on the PCI and the number of the SS blocks in the burst to obtain the target time-domain offset.

In a possible implementation mode, the method may further include that: the network device sends second information to the terminal device, the second information indicates the target time-domain offset of the SS block burst in the first transmission cycle.

In a possible implementation mode, the second information may be an ID of the target time-domain offset in multiple pre-configured time-domain offsets.

In a possible implementation mode, the first information and the second information may be carried in a system message, a broadcast message or RRC signaling.

In a possible implementation mode, the method may further include that: the network device sends indication information to the terminal device, the indication information indicates the number of time-domain units spacing any two adjacent SS blocks in the SS block burst.

In a possible implementation mode, the method may further include that: the network device sends the indication information to the terminal device, the indication information indicates the number of the SS blocks in the burst.

In a possible implementation mode, the method may further include that: the network device sends the indication information to the terminal device, the indication information indicates the time-domain position of the SS block burst in the first transmission cycle.

In a possible implementation mode, the method may further include that: the network device sends the indication information to the terminal device, the indication information indicates a first correspondence in multiple correspondences, and the correspondences are mappings of timing sequences of the SS blocks in the burst in the first transmission cycle.

In a possible implementation mode, the indication information may be carried in at least one of the broadcast message, the system message, the RRC signaling, MAC CE signaling and DCI.

In a possible implementation mode, the operation that the network device sends the indication information to the terminal device may include that: the network device sends the indication information to the terminal device on a primary carrier.

In a possible implementation mode, the primary carrier may be a carrier in an NR or LIE system.

In a possible implementation mode, the SS block may include a PSS and an SSS.

In a possible implementation mode, the SS block may further include a PBCH and a DMRS for demodulating the PBCH.

A fifth aspect provides a terminal device, which is configured to execute the method in the first aspect or any possible implementation mode of the first aspect. Specifically, the terminal device includes units configured to execute the method in the first aspect or any possible implementation mode of the first aspect.

A sixth aspect provides a terminal device, which is configured to execute the method in the second aspect or any possible implementation mode of the second aspect. Specifically, the terminal device includes units configured to execute the method in the second aspect or any possible implementation mode of the second aspect.

A seventh aspect provides a network device, which is configured to execute the method in the third aspect or any possible implementation mode of the third aspect. Specifically, the network device includes units configured to execute the method in the third aspect or any possible implementation mode of the third aspect.

An eighth aspect provides a network device, which is configured to execute the method in the fourth aspect or any possible implementation mode of the fourth aspect. Specifically, the network device includes units configured to execute the method in the fourth aspect or any possible implementation mode of the fourth aspect.

A ninth aspect provides a terminal device, which includes a memory, a processor, an input interface and an output interface. Herein, the memory, the processor, the input interface and the output interface are connected through a bus system. The memory is configured to store an instruction. The processor is configured to execute the instruction stored in the memory to execute the method in the first aspect or any possible implementation mode of the first aspect.

A tenth aspect provides a terminal device, which includes a memory, a processor, an input interface and an output interface. Herein, the memory, the processor, the input interface and the output interface are connected through a bus system. The memory is configured to store an instruction. The processor is configured to execute the instruction stored in the memory to execute the method in the second aspect or any possible implementation mode of the second aspect.

An eleventh aspect provides a network device, which includes a memory, a processor, an input interface and an output interface. Herein, the memory, the processor, the input interface and the output interface are connected through a bus system. The memory is configured to store an instruction. The processor is configured to execute the instruction stored in the memory to execute the method in the third aspect or any possible implementation mode of the third aspect.

A twelfth aspect provides a network device, which includes a memory, a processor, an input interface and an output interface. Herein, the memory, the processor, the input interface and the output interface are connected through a bus system. The memory is configured to store an instruction. The processor is configured to execute the instruction stored in the memory to execute the method in the fourth aspect or any possible implementation mode of the fourth aspect.

A thirteenth aspect provides a computer storage medium, which is configured to store a computer software instruction for executing the method in the first aspect or any possible implementation mode of the first aspect, or the method in the second aspect or any possible implementation mode of the second aspect, or the method in the third aspect or any possible implementation mode of the third aspect or the method in the fourth aspect or any possible implementation mode of the fourth aspect, the instruction including a program designed to execute the aspects.

These aspects or other aspects of the application will become clearer and easier to understand through the following descriptions about the embodiments.

DETAILED DESCRIPTION

Figure 1:
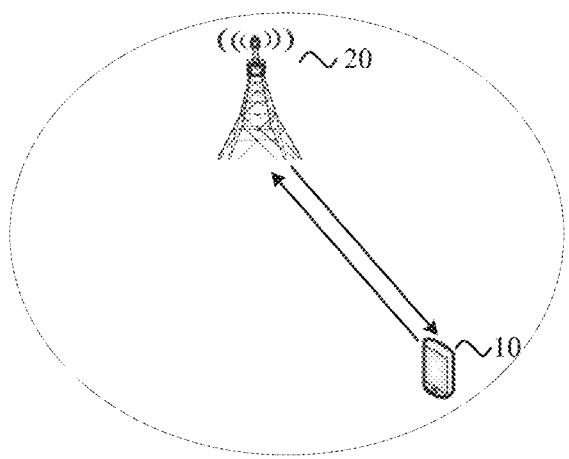
FIG. 1 illustrates a schematic diagram of an application scenario based on an embodiment of the application.

The technical solutions in the embodiments of the application will be clearly and completely described below in combination with the drawings in the embodiments of the application.

It is to be understood that the technical solutions of the embodiments of the application may be applied to various communication systems, for example, a Global System of Mobile communication (GSM), a Code Division Multiple Access (CDMA) system, a Wideband Code Division Multiple Access (WCDMA) system, a General Packet Radio Service (CPRS), an LTE system, an LTE Frequency Division Duplex (FDD) system, LIE Time Division Duplex (TDD), a Universal Mobile Telecommunication System (UMTS), a Worldwide Interoperability for Microwave Access (WiMAX) communication system, NR or a future 5th-Generation (5G) system.

Particularly, the technical solutions of the embodiments of the application may be applied to various non orthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the application may be applied to multi-carrier transmission systems adopting non orthogonal multiple access technologies, for example, OFDM, Filter Bank Multi-Carrier (FBMC), Generalized Frequency Division Multiplexing (GFDM) and Filtered-OFDM (F-OFDM) systems adopting the non orthogonal multiple access technologies.

In the embodiments of the application, a terminal device may be a user equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, UE in a future 5G network, UE in a future evolved Public Land Mobile Network (PLMN) or the like. There are no limits made in the embodiments of the application.

In the embodiments of the application, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like. There are no limits made in the embodiments of the application.

FIG. 1 illustrates a schematic diagram of an application scenario based on an embodiment of the application. A communication system in FIG. 1 may include a terminal device 10 and a network device 20. The network device 20 is configured to provide a communication service for the terminal device 10 for access to a core network. The terminal device 10 searches a synchronization signal, a broadcast signal and the like from the network device 20 to access the network, thereby communicating with the network. Arrows illustrated in FIG. 1 may represent uplink/downlink transmission implemented through a cellular link between the terminal device 10 and the network device 20.

In an LTE system, a terminal device needs to implement a cell search process during initial access or when the terminal device needs to measure a neighbor cell. The terminal device performs cell search to acquire a physical ID(s) of the cell(s), and to acquire timing synchronization and frequency synchronization information of the system. This process is unrelated to system bandwidth, and the terminal device may directly perform detection and acquisition. Different cells are distinguished in a physical layer with their respective PCIs. There are totally 504 PCIs, which are classified into 168 groups (recorded as N(1)_ID and ranging from 0 to 167), and each group includes three different intra-group IDs (recorded as N(2)_ID and ranging from 0 to 2). Therefore, a PCI (recorded as Ncell_ID) may be calculated by using the following formula:

$$PCI = N_{ID}^{cell} = 3N_{ID}^{(1)} + N_{ID}^{(2)},$$

A PSS is configured to transmit a value of an intra-group ID, i.e., N(2)_ID, and an SSS is configured to transmit a value of a group ID, i.e., N(1)_ID. For an FDD system, PSSs periodically appear on the last OFDM symbol of each of slot 0 and slot 10, and SSSs periodically appear on the second last symbol of each of slot 0 and slot 10. For a TDD system PSSs periodically appear on the third OFDM symbol of each of subframes 1 and 6, and SSSs periodically appear on the last symbol of each of subframes 0 and 5.

In an NR communication system, designs of a multi-antenna array, beam forming and the like are introduced. For example, a previous cell is updated to be covered with multiple beams, the beam gain may compensate for, to a certain extent, coverage reduction brought by use of a high frequency band, and may reduce mutual interference and enhance system performance.

Figure 2:
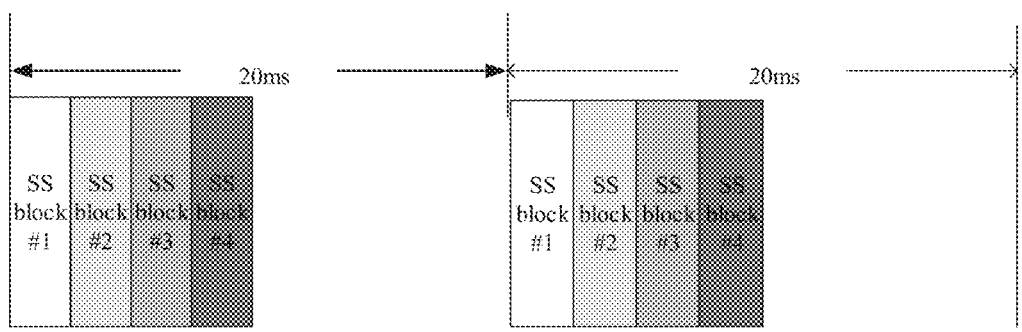
FIG. 2 is a configuration diagram of timing sequences of an SS block burst in a transmission cycle.
Figure 3:
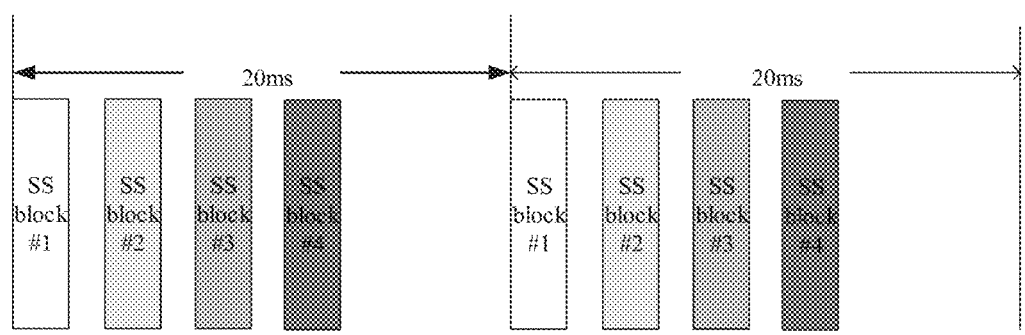
FIG. 3 is another configuration diagram of a timing sequence of an SS block burst in a transmission cycle.
Figure 4:
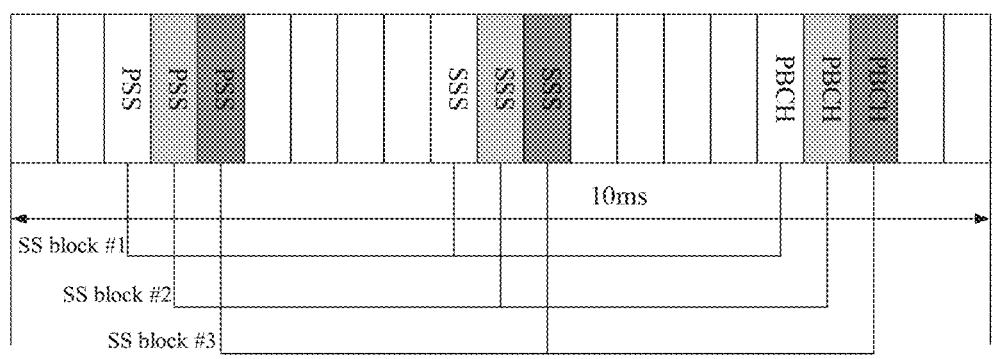
FIG. 4 is yet another configuration diagram of a timing sequence of an SS block burst in a transmission cycle.

SS blocks are introduced into the NR system, and mainly include PSSs and SSSs. Some SS blocks may further include PBCH and may even include DMRSs for demodulating the PBCHs. There are no limits made to types of signals included in an SS block in the embodiments of the application. In the NR system, a length of an SS may be increased, for example, to 127; or, the SS may be repeated in frequency domain, thus causing a synchronization bandwidth to be increased by integer times. The SS block is taken as a minimum unit of an SS, and multiple SS blocks form an SS block burst, as illustrated in FIG. 2. An SS cycle, i.e., a transmission cycle of an SS block burst, is 20 ms. Herein, the transmission cycle of the SS block burst may be considered as a transmission cycle of the same SS block in the same cell. For example, four beams may be adopted to send SS block#1, SS block#2, SS block#3 and SS block#4. The SS blocks may have no spacing, as illustrated in FIG. 2, or may be spaced by certain time-domain units, as illustrated in FIG. 3. In a transmission cycle of an SS block burst, signals of different SS blocks may be overlapped in time, as illustrated in the timing sequence diagram of FIG. 4.

Figure 5:
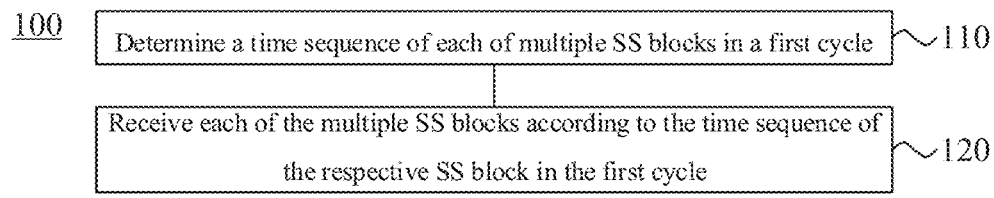
FIG. 5 illustrates a schematic block diagram of a signal transmission method based on an embodiment of the application.

FIG. 5 illustrates a schematic block diagram of a signal transmission method 100 based on an embodiment of the application. As illustrated in FIG. 5, the method 100 may be executed by a terminal device, and may specifically be executed by a UE. The method 100 includes the following actions.

In S110, a timing sequence of each of multiple SS blocks in a first cycle is determined.

In S120, each of the multiple SS blocks is received based on the timing sequence of the SS block in the first cycle.

First of all, it is to be noted that the timing sequence of the SS block means a time-domain resource used by the SS block, and may take time-domain unit as a unit. For example, a resource in the first cycle includes seven OFDM symbols in time domain, and if a network device sends three SS blocks to the terminal device, and the network device informs the terminal device of the specific OFDM symbols where the three SS blocks are located in the first cycle in a certain manner, the terminal device may directly receive the three SS blocks on the OFDM symbols informed by the network device.

Alternatively, a time length of the first cycle may be equal to a transmission cycle of the multiple SS blocks.

It is to be understood that the length of the cycle in the embodiment of the application may be similar to a cycle of an SS in the prior art, or may be a transmission cycle of any SS block of the same cell, or may be a transmission cycle of a same beam transmitting a SS block of the same cell. It may specifically be a cycle 20 ms illustrated in FIG. 2 or FIG. 3. Herein, when types of signals in an SS block are the same as those of another SS block, and contents of the signals in the former SS block are the same as those of the latter SS block, the SS blocks are the same SS block. If two SS blocks include different signal types or include the same signal types but incompletely the same signal contents, or different beams are adopted for the two SS blocks, the two SS blocks are different from each other. For example, SS block#1 includes a PSS and an SSS, N(2)_ID transmitted in the PSS is 0, N(2)_ID transmitted in the SSS is 10, and beam 1 is adopted; SS block#2 also includes a PSS and an SSS, but N(2)_ID transmitted in the PSS is 0, N(2)_ID transmitted in the SSS is 10, and beam 2 is adopted, or SS block#2 includes the PSS, the SSS and a PBCH; and therefore, SS block#1 and SS block#2 are different.

It is also to be understood that the terminal device may further determine that a certain time-domain resource in a cycle is configured to receive multiple SS blocks, and then the terminal device may detect the multiple SS blocks on this time-domain resource. For example, if the network device sends five SS blocks to the terminal device in a cycle, the terminal device may determine to receive the SS blocks on a second time-domain unit to a sixth time-domain unit in the cycle, but may merely detect the five SS blocks on the second time-domain unit to a fourth time-domain unit. That is, the terminal device does not have to determine the specific resource on which each SS block is transmitted, and merely needs to know a general position.

Therefore, based on the signal transmission method of the embodiment of the application, the terminal device may determine the tuning sequences of the multiple SS blocks in the cycle in advance, and then may receive the SS blocks on fixed time-domain resources, so that the terminal device can greatly reduce calculation complexity, reduce detection time and reduce power consumption.

Figure 6:
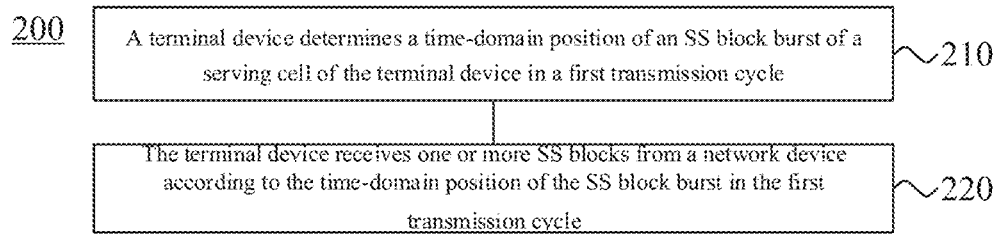
FIG. 6 is another schematic block diagram of a signal transmission method based on an embodiment of the application.

FIG. 6 illustrates a schematic block diagram of a signal transmission method 200 based on an embodiment of the application. As illustrated in FIG. 6, the method 200 includes the following actions.

In S210, a terminal device determines a time-domain position of an SS block burst of a serving cell of the terminal device a first transmission cycle.

In S220, the terminal device receives one or more SS blocks from a network device based on the time-domain position of the SS block burst in the first transmission cycle.

As described above, as long as the terminal device determines the time-domain position of the SS block burst of the serving cell in the transmission cycle, the terminal device may receive SS blocks from the network device at the corresponding position. It is to be understood that the SS block burst is configured for the terminal device by the network device, but the number of SS blocks actually sent to the terminal device by the network device may be equal to the number of the SS blocks in the burst, or may be smaller than the number of the SS blocks in the burst. For example, the network device configures five SS blocks for cell 1, and the network device sends three SS blocks to the terminal device in the cell 1. Then, the terminal device may detect the three SS blocks at determined time-domain positions of the five SS blocks.

In such a manner, based on the signal transmission method of the embodiment of the application, the terminal device may determine the time-domain position of the SS block burst of the serving cell of the terminal device in the transmission cycle in advance, and then may receive SS blocks on a fixed time-domain resource, so that the terminal device can greatly reduce calculation complexity, reduce detection time and reduce power consumption.

Alternatively, in the embodiment of the application, the operation that the terminal device determines the time-domain position of the SS block burst of the serving cell of the terminal device in the first transmission cycle includes that, the terminal device determines the time-domain position of the SS block burst in the first transmission cycle based on a PCI of the serving cell of the terminal device.

As mentioned above, in the LTE system, the PCI is a wireless signal for distinguishing different cells and avoiding the same PCI within coverage of the related cells. In the LTE system, a cell ID grouping manner is used in a cell search flow, firstly a cell group ID is determined through an SSS, and then a specific cell ID is determined through a PSS. The principles of PCI planning are as follows.

1) Collision-free principle: if a same PCI is allocated to two neighbor cells, at most one cell may be detected by UE in an overlapped region, while the UE may merely be synchronized to one cell during initial cell search, and the cell may not be the most suitable. This condition is called collision. Therefore, during PCI planning, it is necessary to ensure that a multiplexing spacing distance of the cells with the same PCI is at least four layers of stations (referring to an empirical value of CDMA Pseudo Noise (PN) code planning) and greater than five times of a cell coverage radius.)

2) Confusion-free principle: two neighbor cells of a cell have the same PCI, and under this condition, if the UE requests for handover to a cell with an ID A, an eNB does not know which one is the destination cell. This condition is called confusion.

Therefore, the network device and the terminal device may reach an agreement on a mapping relationship between PCIs and time-domain positions of SS block bursts. From the above, it can be seen that there may be multiple PCIs, and a transmission cycle of one SS block burst may be less than the number of the PCIs. In other words, multiple PCIs may correspond to a time-domain position of one possible SS block burst. Specifically, the network device may make PCIs of neighbor cells corresponding to different time-domain positions of the SS block burst. For example, if a transmission cycle of an SS block burst includes seven OFDM symbols, and the SS block burst occupies three continuous symbols, possible positions of the SS block burst in the transmission cycle of the SS block burst include five possible positions, i.e., symbols 1-3, symbols 2-4, symbols 3-5, symbols 4-6 and symbols 5-7. Then the network device may classify PCIs into five groups, each group corresponding to a group of possible positions of the SS block burst, and notify the terminal device of such configuration information, and the terminal device, when knowing the PCI of the serving cell of the terminal device, may determine the specific time-domain position for detection of SS blocks.

It is to be understood that the network device may adopt a calculation rule to map all or part of the PCIs to the five possible time-domain positions of the SS block burst and notify the terminal device of this calculation rule, and the terminal device, when acquiring the PCI of the serving cell of the terminal device, may calculate the time-domain position where it needs to detect the SS blocks based on the preset rule. Specifically, the preset rule may be a function, for example, a hash function.

Alternatively, in the embodiment of the application, the operation that the terminal device determines the time-domain position of the SS block burst in the first transmission cycle based on the PCI of the serving cell of the terminal device includes that, the terminal device determines a target time-domain offset of the SS block burst relative to a first position in the first transmission cycle based on the PCI; and the terminal device determines the time-domain position of the SS block burst in the first transmission cycle based on the target time-domain offset.

Figure 7:
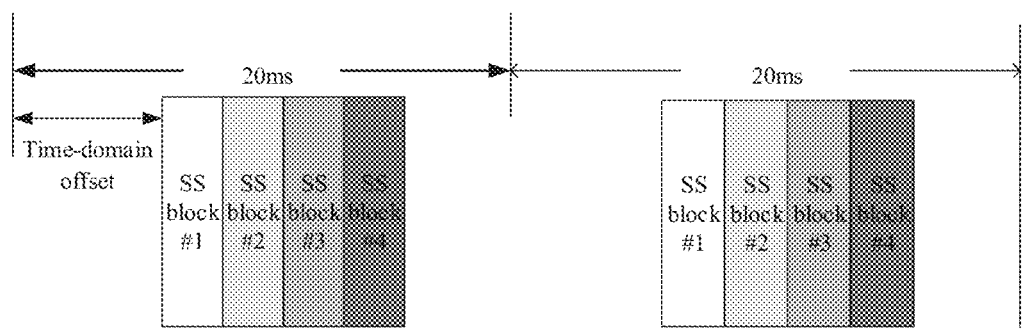
FIG. 7 is yet another schematic block diagram of a signal transmission method based on an embodiment of the application.
Figure 8:
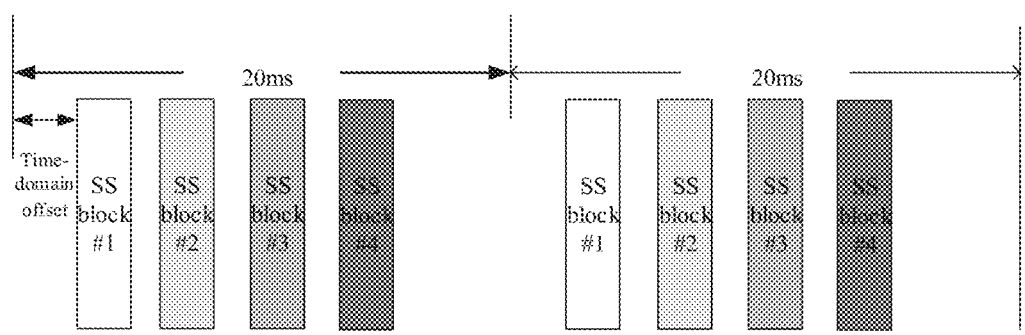
FIG. 8 is yet another schematic block diagram of a signal transmission method based on an embodiment of the application.

A time-domain offset may be understood as an offset of an SS block burst of a certain cell relative to a starting position of a certain transmission cycle in time domain, as illustrated in FIG. 7 and FIG. 8. It is to be understood that FIG. 7 and FIG. 8 are merely illustrations, and the time-domain offset should not be narrowly understood as a starting position of an SS block burst; instead, the time-domain offset may also be an offset of a second SS block in FIG. 7 and FIG. 8 relative to a starting position of a certain transmission cycle on the time domain.

In an NR system, the network device may send multiple SS blocks to the terminal device, that is, multiple time-domain units may be taken. If the terminal device does not know the specific time-domain units on which the network device may send the SS blocks, the terminal device is very likely to detect the SS blocks on resources of the whole transmission cycle, which imperceptibly increases complexity, power consumption and the like of the terminal device. In the embodiment of the application, the network device may configure a timing sequence of the SS block burst of the cell in advance, and may merely need to inform the terminal device of the time-domain offset of the SS block burst, and then the terminal device may know a time-domain resource taken by the whole SS block burst. The network device adopts a certain rule to design time-domain offsets of SS blocks of different cells, so that interference between the cells may be reduced.

Alternatively, in the embodiment of the application, the operation that the terminal device determines the target time-domain offset of the SS block burst relative to the first position in the first transmission cycle based on the PCI includes that: the terminal device determines the target time-domain offset based on the PCI and a mapping relationship between PCIs and time-domain offsets.

Alternatively, in the embodiment of the application, the method further includes that: the terminal device receives first information from the network device; and the operation that the terminal device determines the target time-domain offset of the SS block burst relative to the first position in the first transmission cycle based on the PCI includes that: the terminal device determines the target time-domain offset based on the PCI and the first information.

Alternatively, in the embodiment of the application, the first information is the number of the SS blocks in the burst or timing sequence information of the SS block burst in the first transmission cycle, and the operation that the terminal device determines the target time-domain offset based on the PCI and the first information includes that: the terminal device determines the target time-domain offset based on the PCI and the number of the SS blocks in the burst; or the terminal device determines the target time-domain offset based on the PCI and the timing sequence information of the SS block burst in the first transmission cycle.

Alternatively, in the embodiment of the application, the operation that the terminal device determines the target time-domain offset based on the PCI and the number of the SS blocks in the burst includes that: the terminal device executes a remainder operation on the PCI and the number of the SS blocks in the burst to obtain the target time-domain offset.

Similar to determination of the time-domain position of the SS block burst based on the PCI, the network device may also configure the mapping relationship between the PCIs and the time-domain offsets in advance. Or the network device and the terminal device predetermine a rule, and the PCI may be calculated based on the rule to obtain the corresponding time-domain offset thereof. For example, if the time-domain offset is the starting position of the SS block burst in the transmission cycle, the network device may configure multiple PCIs to correspond to one starting position through a certain design rule. As illustrated in FIG. 7, a transmission cycle includes seven symbols, and possible time-domain positions corresponding to the SS block burst include four positions, i.e., symbols 1-4, symbols 2-5, symbols 3-6 and symbols 4-7. In other words, possible time-domain offsets are four values 1, 2, 3 and 4. Then, the network device may divide the PCIs into four groups, one group corresponding to the time-domain offset 1, another group corresponding to the time-domain offset 2, yet another group corresponding to the time-domain offset 3 and the last group corresponding to the time-domain offset 4. If the terminal device determines the PCI of the serving cell of the terminal device, the terminal device may determine the time-domain offset corresponding to the PCI of the serving cell of the terminal device through this mapping relationship. Moreover, the terminal device knows the timing sequence of the SS block burst of the serving cell of the terminal device, that is, the terminal device knows that the SS block burst is sent on four continuous time-domain units, and then the terminal device may know the possible positions of the SS block burst, thereby detecting the SS block at the determined positions.

For another example, the network device presets a rule such that only the four offsets may be obtained by calculating various PCIs. Then, the terminal device, after knowing the PCI of the serving cell of the terminal device, may calculate the time-domain offset of the SS block burst of the serving cell of the terminal device based on the preset rule and further determine the specific time-domain position of the SS block burst based on the calculated time-domain offset and the timing sequence specified in a protocol. For example, the preset rule may be combining other information, for example, the number of the SS blocks in the burst of the serving cell of the terminal device or a mapping method for the SS block burst.

The preset rule will be described below with some possible examples.

1: Modulus processing: an offset position is obtained by PCI mod G (G is a value specified in the protocol, or an integer determined based on a system configuration (for example, an intra-burst SS block mapping method or the number of all SS blocks in a burst), or a certain value notified to the UE through system broadcast).

2: Modulus processing: the offset position is obtained by PCI mod G+ offset.

3: Modulus processing: the offset position is obtained by (PCI mod G)*J.

4: Modulus processing: the offset position is obtained by (PCI mod G+ offset) *J.

5: Modulus processing: the offset position is obtained by (PCI mod G)*J+offset.

Some parameters G, offset and J mentioned above may include some of the following options (each is an independent option): each of them may be a value specified in the protocol, or an integer determined based on the system configuration (for example, the intra-burst SS block mapping method or the number of all of the SS blocks in the burst), or a certain value notified to the UE through the system broadcast.

Descriptions will be made with combination of the PCI and the number of the SS blocks in the burst as an example.

As illustrated in FIG. 7, the number of SS blocks in a burst is 4, and there are three values for PCI mod 4, including 0, 1, 2 and 3. That is, if the PCI of the serving cell of the terminal device is 162, 162 mod 4 is equal to 2, the terminal device may know that the time-domain offset of the SS block burst of the cell is 2. Since the PCIs are classified into four groups of which remainder results are 0, 1, 2 and 3 respectively, the network device may configure the PCIs of different groups for neighbor cells. Therefore, interference of SS blocks of the neighbor cells may be reduced.

Descriptions will be made with combination of the PCI and the timing sequence of the SS block as an example.

Figure 9:
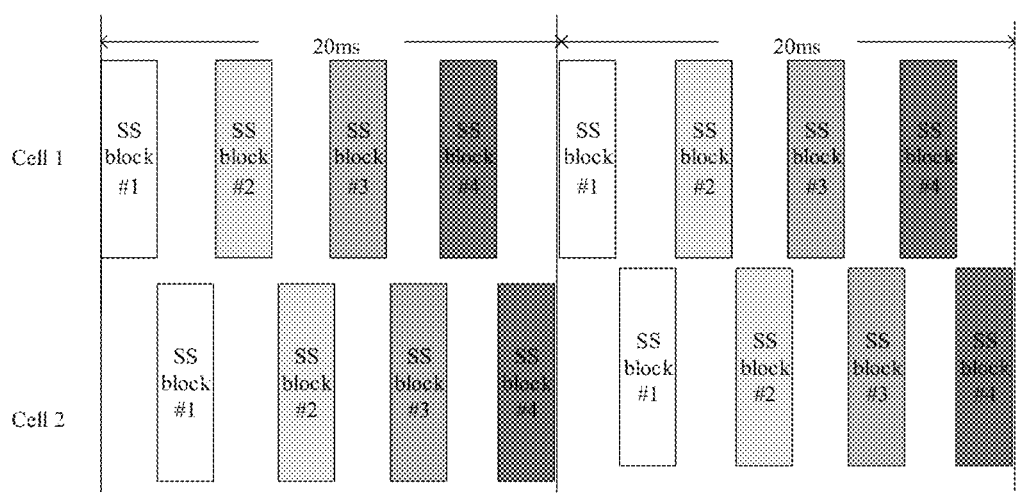
FIG. 9 is yet another schematic block diagram of a signal transmission method based on an embodiment of the application.

As illustrated in FIG. 9, if a spacing between SS blocks in the SS block burst is 1, two time-domain offsets may be configured. Similarly, the PCIs may be classified into two groups, one group corresponding to the time-domain offset 0, and the other group corresponding to the time-domain offset 1. The network device may configure the PCIs of different groups for the neighbor cells, thereby reducing the interference of the SS blocks of the neighbor cells.

It is to be understood that each calculation rule is schematically described and not intended to limit the application and, moreover, the specific information with which the PCI is combined to determine the time-domain offset in the embodiment of the application is also only exemplary.

It is also to be understood that the network device may further preset another rule such that the terminal device and the network device may directly determine the time-domain position of the SS block burst rather than merely determining the time-domain offset based on the PCI and other information.

Alternatively, in the embodiment of the application, the method further includes that: the terminal device receives a first SS block in the SS block burst from the network device, and the terminal device determines the PCI of the serving cell of the terminal device based on the first SS block; and the operation that the terminal device receives the SS from the network device based on the time-domain offset includes that: the terminal device receives a second SS block in the SS block burst from the network device based on the time-domain offset.

That is, the terminal device, after detecting one SS block, may determine the PCI of the serving cell of the terminal device based on a content of the SS block. Further, the terminal device may determine the time-domain offset of the SS block burst of the cell where it is positioned based on the PCI. Furthermore, the terminal device may determine specific positions of time-domain resources taken by all SS blocks. Therefore, the terminal device may detect the other SS blocks at the determined time-domain positions.

Alternatively, the network device may also send the PCI of the serving cell of the terminal device to the terminal device through a system message or a broadcast message before sending the SS block. Then, the terminal device may determine the positions of the time-domain resources taken by all of the SS blocks directly based on the PCI. Therefore, the terminal device may detect all of the SS blocks at the determined time-domain positions.

Alternatively, in the embodiment of the application, the method further includes that: the terminal device receives second information from the network device, the second information indicates the target time-domain offset of the SS block burst in the first transmission cycle; and the operation that the terminal device determines the time-domain position of the SS block burst of the serving cell of the terminal device in the first transmission cycle includes that: the terminal device determines the target time-domain offset based on the second information, and the terminal device determines the time-domain position of the SS block burst in the first transmission cycle based on the target time-domain offset.

The time-domain offset may be determined by the network device in each above mentioned manner. The network device directly informs the terminal device of the determined time-domain offset, so that the terminal device may know the time-domain position of the SS block burst configured for the terminal device. The network device may directly inform the terminal device of the value, or may inform the terminal device of a number, so that the terminal device may directly determine the time-domain offset related to it based on the number.

The network device directly informs the terminal device of the determined time-domain offset or replaces the PCI with information about the determined time-domain offset, so that system flexibility may be improved, and an additional burden for PCI optimization may be reduced.

Alternatively, in the embodiment of the application, the second information is an ID of the target time-domain offset, and the operation that the terminal device determines the target time-domain offset based on the second information includes that: the terminal device determines the target time-domain offset from multiple pre-configured time-domain offsets based on the ID of the target time-domain offset.

The network device may inform the terminal device of the multiple configured time-domain offsets, and the network device may inform the terminal device of the ID of the time-domain offset of the SS block burst of the serving cell of the terminal device. Then, the terminal device may select the time-domain offset determined by the network device from the multiple time-domain offsets. For example, the network device configures the time-domain offsets 0, 1, 2 and 3. For the terminal device in the cell of which the PCI is 162, the offset is 2. The network device may identify the four time-domain offsets with two bits and, for example, may identify the time-domain offset 0 with 00, identify the time-domain offset 1 with 01, identify the time-domain offset 2 with 10, and identify the time-domain offset 3 with 11. Then, the network device may send indication information of which a bit value is 10 to the terminal device, so that the terminal device may determine that the network device configures the SS block burst with the offset 2, i.e., on symbols 3-6, in the four time-domain offsets, and then the terminal device may detect the SS block from the network device on the symbols 3-6.

Alternatively, in the embodiment of the application, the operation that the terminal device determines the time-domain position of the SS block burst of the serving cell of the terminal device in the first transmission cycle includes that: the terminal device receives a first SS block in the SS block burst from the network device, and the terminal device determines the time-domain position of the SS block burst in the first transmission cycle based on a time-domain position of the first SS block in the first transmission cycle and the timing sequence information of the SS block burst in the first transmission cycle; and the operation that the terminal device receives the SS block from the network device based on the time-domain position of the SS block burst in the first transmission cycle includes that: the terminal device receives a second SS block in the SS block burst from the network device based on the time-domain position of the SS block burst in the first transmission cycle.

Specifically, if the terminal device detects a position of a certain SS block in a certain transmission cycle, the terminal device may learn about an ID of the SS block at the same time. If the network device pre-configures a time-sequence of an SS block burst in the transmission cycle, for example, if the network device configures the SS block burst to be sent on four continuous symbols, when the terminal device detects any one SS block, the terminal device may know time-domain resources where other SS blocks are positioned, so that the terminal device may detect the other SS blocks on the determined time-domain resources of the other SS blocks.

Alternatively, in the embodiment of the application, the timing sequence information includes the number of time-domain units spacing any two adjacent SS blocks in the SS block burst, and the method further includes that: the terminal device receives indication information from the network device, the indication information indicates the number of the time-domain units; and the operation that the terminal device determines the time-domain position of the SS block burst in the first transmission cycle based on the time-domain position of the first SS block in the first transmission cycle and the timing sequence information of the SS block burst in the first transmission cycle includes that: the terminal device determines the time-domain position of the SS block burst in the first transmission cycle based on the time-domain position of the first SS block in the first transmission cycle and the number of the time-domain units.

Alternatively, the network device may further send the indication information to the terminal device in advance, the indication information indicates the number of the time-domain units between the two adjacent SS blocks in the SS block burst. If the terminal device detects a timing sequence of one SS block, the terminal device may determine a possible sequence of the other SS block based on the number of the time-domain units, indicated in the indication information, between the two adjacent SS blocks in the SS block burst.

Furthermore, if the number of the time-domain units between any two SS blocks is the same, the indication information sent to the terminal device by the network device may only indicate a spacing number, and if the network device also informs the terminal device of the number of the SS blocks in the burst, the terminal device may determine the possible time-domain positions of the SS block burst configured by the network device. No matter whether the number of the time-domain units between any two SS blocks is the same or not, the indication information sent to the terminal device by the network device may indicate multiple spacings, and the terminal device may determine the possible time-domain positions of the SS block burst configured by the network device even if the network device does not inform the terminal device of the number of the SS blocks in the burst.

For example, if the network device configures live SS blocks for the terminal device in the cell 1 and the network device configures transmission on first, third, fifth, seventh and ninth time-domain units in an SS burst cycle, the network device may inform the terminal device that every two SS blocks are spaced by one time-domain unit. When the terminal device detects one SS block, for example, the SS block on the third time-domain unit, the terminal device may sequentially detect SS blocks on the other odd time-domain units in the SS burst cycle. The network device may also inform the terminal device of the total number of the SS blocks at the same time of informing the terminal device that the two adjacent SS blocks are equally spaced and of the number of the spacing time-domain units. For another example, the number of the time-domain units between any two SS blocks may also be unequal. Then, the network device may inform the terminal device of the spacing number (K-1), K is the number of SS blocks. The terminal device, after detecting one SS block, may determine the time-domain resource positions of the other SS blocks in the SS burst cycle based on the spacing number (K-1). Or, the network device may further inform the terminal device of the time-domain resource position of the first SS block in the SS burst cycle, and then the terminal device may determine the positions of the other SS blocks directly based on the spacing between every two SS blocks in the multiple SS blocks and the position of the first SS block.

Alternatively, in the embodiment of the application, the method further includes that: the terminal device receives the indication information from the network device, the indication information indicates the number of the SS blocks in the burst; and the operation that the terminal device determines the time-domain position of the SS block burst of the serving cell of the terminal device in the first transmission cycle includes that: the terminal device determines the time-domain position of the SS block burst in the first transmission cycle based on the number of the SS blocks in the burst.

Furthermore, the network device configures multiple correspondences for the terminal device and send them to the terminal device. The network device sends the indication information to the terminal device, the indication information indicates the number of the SS blocks in the burst, and the terminal device determines a first correspondence in the multiple correspondences based on the number indicated in the indication information, and determines a timing sequence of each SS block in the first cycle based on the first correspondence.

Specifically, the network device may configure a relationship between the number of SS blocks sent to the terminal device and timing sequences of these SS blocks in an SS burst cycle in advance. For example, the network device may configure three SS blocks to be transmitted on first three time-domain units of an SS burst cycle respectively. Or the network device may configure five SS blocks to be transmitted on first, third, fifth, seventh and ninth time-domain units of an SS burst cycle respectively. Or the network device may further configure timing sequences of the three SS blocks and timing sequences of the five SS blocks at the same time. In a word, in such an indication manner, a timing sequence of an SS block is usually configured statically or semi-statically.

Alternatively, in the embodiment of the application, the method further includes that: the terminal device receives the indication information from the network device, the indication information indicates the time-domain position of the SS block burst in the first transmission cycle; and the operation that the terminal device determines the time-domain position of the SS block burst of the serving cell of the terminal device in the first transmission cycle includes that: the terminal device determines the time-domain position of the SS block burst in the first transmission cycle based on the indication information.

Specifically, the network device may further dynamically indicate the specific position of each SS block in SS blocks in an SS burst cycle to the terminal device. For example, the network device may directly indicate the terminal device that three SS blocks to be sent are configured on first three time-domain units of an SS burst cycle. Then, the terminal device, after receiving the indication information, may directly detect the three SS blocks on the first three time-domain units of the SS burst cycle.

Alternatively, in the embodiment of the application, the method further includes that: the terminal device receives the indication information from the network device, the indication information indicates a first correspondence in multiple correspondences, and the correspondences are mappings of timing sequences of the SS blocks in the burst in the first transmission cycle; and the operation that the terminal device determines the time-domain position of the SS block burst of the serving cell of the terminal device in the first transmission cycle includes that: the terminal device determines the time-domain position of the SS block burst in the first transmission cycle based on the first correspondence.

Specifically, the network device may fix the time-domain position of the SS block burst in the SS burst cycle in advance, and may configure the multiple correspondences in advance. For example, the network device configures five SS blocks to be sent to the terminal device in advance, and fixes time-domain resources configured to send the five SS blocks in the SS burst cycle. For example, the five SS blocks may be fixed on first five time-domain units in the SS burst cycle. The network device may also fix the five SS blocks on second, third, fifth, seventh and eighth time-domain units in the SS burst cycle. The network device may store the two configuration relationships and send the two configuration relationships to the terminal device. When the network device is prepared to send the five SS blocks to the terminal device, a piece of indication information may be sent to the terminal device at first to indicate one configuration relationship, and then the terminal device, after receiving the indication information, may know the specific configuration relationship and then adopt the configuration relationship indicated in the indication information to receive the SS blocks from the network device. For example, 1-bit indication information may be adopted to indicate the configuration relationship, the first configuration relationship may be represented with 0, and the second configuration relationship may be represented with 1.

It is to be understood that each indication manner is schematically described and the network device may further combine each indication manner to enable the terminal device to determine the time-domain positions of the multiple SS blocks in the SS burst cycle.

Alternatively, in the embodiment of the application, the indication information may be carried in at least one of a broadcast message, a system message, RRC signaling, MAC CE signaling and DCI signaling.

Specifically, under the condition that the terminal device does not establish a network connection with the network device, each piece of indication information may be sent through the broadcast message or system message of the cell. After the terminal device establishes an RRC connection with the network device, the network device may send each piece of indication information based on a specification or a requirement through the RRC signaling, the MAC CE signaling or the DCI signaling. The time-domain position of the SS block in the SS burst cycle may be specified in the protocol, or may be configured statically or semi-statically by the network device.

Alternatively, in the embodiment of the application, the operation that the indication information from the network device is received includes that: the indication information from the network device is received on a primary carrier.

A carder in an LTE system or an NR system may serve as a primary carrier, and a timing sequence of an SS block in a secondary carrier in a cycle may be notified to the terminal device through the primary carrier. In other words, the indication information may be sent to the terminal device on the primary carrier through each of the above mentioned signaling.

It is to be noted that multiple SS blocks sent to the terminal device by the network device may be all SS blocks, configured by the network device, in a cell, or may be part of the SS blocks. In the embodiment of the application, the terminal device pays attention to the number of the SS blocks from the network device rather than the number of the SS blocks configured in the cell. The multiple SS blocks sent to the terminal device by the network device may further include part or all of SS blocks of a neighbor cell of the serving cell of the terminal device.

Alternatively, in the embodiment of the application, different SS blocks may be transmitted by different beams, and the network device may send SS blocks corresponding to beams around a beam adopted for the system message or the broadcast message to the terminal device. For example, in FIG. 2, beam 1 is adopted for SS block#1, beam 2 is adopted for SS block#2 and beam 3 is adopted for SS block #3. If the network device adopts beam 2 to send the broadcast message or the system message at the time-domain position of the SS block#2 in FIG. 2, the network device may notify the time-domain position of SS block#3 to the terminal device, and the terminal device may directly receive the SS block at the indicated time-domain position.

It is also to be understood that the time-domain positions of various SS blocks configured by the network device in advance may be time-domain positions of each SS block in the largest number of SS blocks, configured by the network device, in the cell. If the network device sends part of the SS blocks to the terminal device, the terminal device still performs detection at the configured time-domain positions. For example, the largest number of the SS blocks in the cell is 4, and the network device configures each SS block in the four SS blocks to correspond to each time-domain unit in first four time-domain units in the SS burst cycle. If the network device sends three SS blocks to the terminal device, the terminal device still performs detection on the first four time-domain units, and the terminal device may detect the three SS blocks on the first three time-domain units and detect nothing on the last time-domain unit. Or the terminal device may also detect the SS blocks on the last three time-domain units and detect nothing on the first time-domain unit. The embodiment of the application is not limited thereto.

Figure 10:
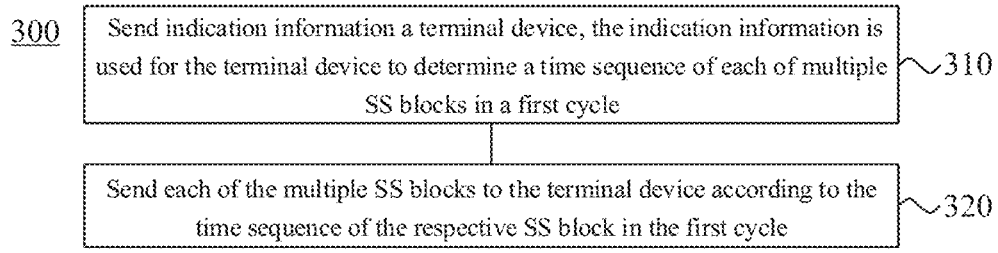
FIG. 10 is yet another schematic block diagram of a signal transmission method based on an embodiment of the application.

It is also to be understood that the time-domain unit in the embodiment of the application may be an OFDM symbol, or may be a slot, a mini-slot and the like, FIG. 10 illustrates a schematic block diagram of a signal transmission method 300 based on an embodiment of the application. As illustrated in FIG. 10, the method 300 may be executed by a network device and may specifically be executed by a base station. The method 300 includes the following actions.

In S310, indication information is sent to a terminal device. The indication information is used for the terminal device to determine a timing sequence of each of multiple SS blocks in a first cycle.

In S320, each of the multiple SS blocks are sent to the terminal device based on the timing sequence of the respective SS block in the first cycle.

In such a manner, based on the signal transmission method of the embodiment of the application, the timing sequences of the multiple SS blocks in the cycle are indicated to the terminal device, so that the terminal device may greatly reduce calculation complexity, reduce detection time and reduce power consumption.

Alternatively, in the embodiment of the application, the multiple SS blocks are different SS blocks of the same cell, and a time length of the first cycle is equal to a transmission cycle of the multiple SS blocks.

Figure 11:
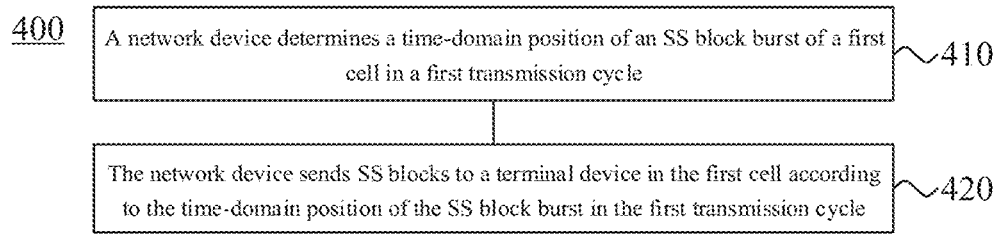
FIG. 11 is yet another schematic block diagram of a signal transmission method based on an embodiment of the application.

FIG. 11 illustrates a schematic block diagram of a signal transmission method 400 based on an embodiment of the application. As illustrated in FIG. 11, the method 400 includes the following actions.

In S410, a network device determines a time-domain position of an SS block burst of a first cell in a first transmission cycle.

In S420, the network device sends an SS block to a terminal device in the first cell based on the time-domain position of the SS block burst in the first transmission cycle.

In such a manner, based on the signal transmission method of the embodiment of the application, the network device sends the SS block on a fixed time-domain resource, and then the terminal device may receive the SS block on the fixed time-domain resource, so that the terminal device may greatly reduce calculation complexity, reduce detection time and reduce power consumption.

Alternatively, in the embodiment of the application, the operation that the network device determines the time-domain position of the SS block burst of the first cell in the first transmission cycle includes that: the network device determines the time-domain position of the SS block burst in the first transmission cycle based on a PCI of the first cell.

Alternatively, in the embodiment of the application, the operation that the network device determines the time-domain position of the SS block burst in the first transmission cycle based on the PCI of the first cell includes that: the network device determines a target time-domain offset of the SS block burst relative to a first position in the first transmission cycle based on the PCI; and the network device determines the time-domain position of the SS block burst in the first transmission cycle based on the target time-domain offset.

Alternatively, in the embodiment of the application, the operation that the network device determines the target time-domain offset of the SS block burst relative to the first position in the first transmission cycle based on the PCI includes that: the network device determines the target time-domain offset based on the PCI and a mapping relationship between PCIs and time-domain offsets.

Alternatively, in the embodiment of the application, the operation that the network device determines the target time-domain offset of the SS block burst relative to the first position in the first transmission cycle based on the PCI includes that: the network device determines the target time-domain offset based on the PCI and first information.

Alternatively, in the embodiment of the application, the first information is the number of the SS block burst or tuning sequence information of the SS block burst in the first transmission cycle, and the operation that the network device determines the target time-domain offset based on the PCI and the first information includes that: the network device determines the target time-domain offset based on the PCI and the number of the SS block burst; or the network device determines the target time-domain offset based on the PCI and the timing sequence information of the SS block burst in the first transmission cycle.

Alternatively, in the embodiment of the application, the operation that the network device determines the target time-domain offset based on the PCI and the number of the SS block burst includes that: the network device executes a remainder calculation operation on the PCI and the number of the SS block burst to obtain the target time-domain offset.

Alternatively, in the embodiment of the application, the method further includes that: the network device sends second information to the terminal device, the second information indicates the target time-domain offset of the SS block burst in the first transmission cycle.

Alternatively, in the embodiment of the application, the second information is an ID of the target time-domain offset in multiple pre-configured time-domain offsets.

Alternatively, in the embodiment of the application, the first information and the second information are carried in a system message, a broadcast message or RRC signaling.

Alternatively, in the embodiment of the application, the method further includes that: the network device sends indication information to the terminal device, the indication information indicates the number of time-domain units spacing any two adjacent SS blocks in the SS block burst.

Alternatively, in the embodiment of the application, the method further includes that: the network device sends the indication information to the terminal device, the indication information indicates the number of the SS block burst.

Alternatively, in the embodiment of the application, the method further includes that: the network device sends the indication information to the terminal device, the indication information indicates the time-domain position of the SS block burst in the first transmission cycle.

Alternatively, in the embodiment of the application, the method further includes that: the network device sends the indication information to the terminal device, the indication information indicates a first correspondence in multiple correspondences, and the correspondences are mappings of timing sequences of the SS blocks in the burst in the first transmission cycle.

Alternatively, in the embodiment of the application, the indication information is carried in at least one of the broadcast message, the system message, the RRC signaling, MAC CE signaling and DCI.

Alternatively, in the embodiment of the application, the operation that the network device sends the indication information to the terminal device includes that: the network device sends the indication information to the terminal device on a primary carrier.

Alternatively, in the embodiment of the application, the primary carrier is a carrier in an NR or LTE system.

Alternatively, in the embodiment of the application, the SS block includes a PSS and an SSS.

Alternatively, in the embodiment of the application, the SS block further includes a PBCH and a DMRS for demodulating the PBCH.

It is to be understood that interaction between the network device and the terminal device and related properties, functions and the like described from the network device correspond to related properties and functions of the terminal device. That is, if the terminal device sends information to the network device, the network device may correspondingly receive the information. For simplicity, no more elaborations will be made herein.

It is also to be understood that, in various embodiments of the application, a magnitude of a sequence number of each process does not mean an execution sequence and the execution sequence of each process should be determined by its function and an internal logic and should not form any limit to an implementation process of the embodiments of the application.

Figure 12:
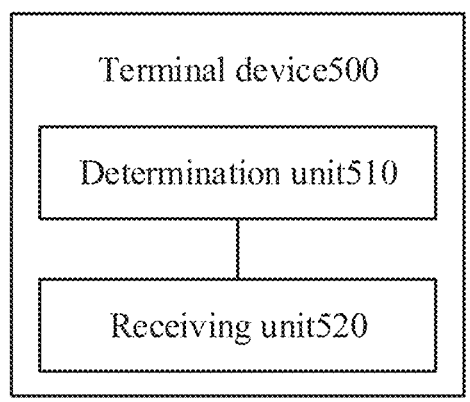
FIG. 12 illustrates a schematic block diagram of a terminal device based on an embodiment of the application.

FIG. 12 illustrates a schematic block diagram of a signal transmission terminal device 500 based on an embodiment of the application. As illustrated in FIG. 12, the terminal device 500 includes a determination unit 510 and a first receiving unit 520.

The determination unit 510 is configured to determine a timing sequence of each of multiple SS blocks in a first cycle.

The first receiving unit 520 is configured to receive the multiple SS blocks based on the timing sequence of each SS block in the first cycle respectively.

In such a manner, the signal transmission terminal device of the embodiment of the application determines the timing sequences of the multiple SS blocks in the cycle in advance and then may receive the SS blocks on fixed time-domain resources, so that the terminal device may greatly reduce calculation complexity, reduce detection time and reduce power consumption.

It is to be understood that the signal transmission terminal device 500 based on the embodiment of the application may correspond to the terminal device in the method 100 of the application and the above mentioned and other operations and/or functions of each unit in the terminal device 500 are adopted to implement the corresponding flows executed by the terminal device in the method in FIG. 5 respectively and will not be elaborated herein for simplicity.

Figure 13:
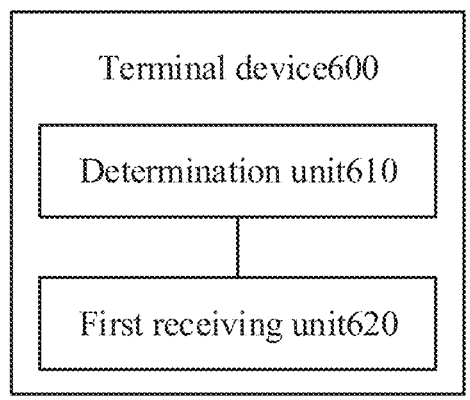
FIG. 13 is another schematic block diagram of a terminal device based on an embodiment of the application.

FIG. 13 illustrates a schematic block diagram of a terminal device 600 based on an embodiment of the application. As illustrated in FIG. 13, the terminal device 600 includes a determination unit 610 and a first receiving unit 620.

The determination unit 610 is configured to determine a time-domain position of an SS block burst of a serving cell of the terminal device in a first transmission cycle.

The first receiving unit 620 is configured to receive an SS block from a network device based on the time-domain position of the SS block burst in the first transmission cycle.

In such a manner, based on the signal transmission method of the embodiment of the application, the terminal device determines the time-domain position of the SS block burst of the serving cell of the terminal device in the transmission cycle in advance and then may receive the SS block on a fixed time-domain resource, so that the terminal device may greatly reduce calculation complexity, reduce detection time and reduce power consumption.

Alternatively, in the embodiment of the application, the determination unit 610 is specifically configured to determine the time-domain position of the SS block burst in the first transmission cycle based on a PCI of the serving cell of the terminal device.

Alternatively, in the embodiment of the application, the determination unit 610 is specifically configured to: determine a target time-domain offset of the SS block burst relative to a first position in the first transmission cycle based on the PCI; and determine the time-domain position of the SS block burst in the first transmission cycle based on the target time-domain offset.

Alternatively, in the embodiment of the application, the determination unit 610 is specifically configured to determine the target time-domain offset based on the PCI and a mapping relationship between PCIs and time-domain offsets.

Alternatively, in the embodiment of the application, the terminal device further includes a second receiving unit 630, configured to receive first information from the network device; and the determination unit 620 is specifically configured to determine the target time-domain offset based on the PCI and the first information.

Alternatively, in the embodiment of the application, the first information is the number of the SS block burst or timing sequence information of the SS block burst in the first transmission cycle, and the determination unit 610 is specifically configured to determine the target time-domain offset based on the PCI and the number of the SS block burst, or determine the target time-domain offset based on the PCI and the timing sequence information of the SS block burst in the first transmission cycle.

Alternatively, in the embodiment of the application, the determination unit 610 is specifically configured to execute a remainder calculation operation on the PCI and the number of the SS block burst to obtain the target time-domain offset.

Alternatively, in the embodiment of the application, the terminal device 600 further includes a third receiving unit 640, configured to receive second information from the network device, the second information indicates the target time-domain offset of the SS block burst in the first transmission cycle; and the determination unit 610 is specifically configured to determine the target time-domain offset based on the second information and determine the time-domain position of the SS block burst in the first transmission cycle based on the target time-domain offset.

Alternatively, in the embodiment of the application, the second information is an of the target time-domain offset, and the determination unit 610 is specifically configured to determine the target time-domain offset in multiple preconfigured time-domain offsets based on the ID of the target time-domain offset.

Alternatively, in the embodiment of the application, the first information and the second information are carried in a system message, a broadcast message or RRC signaling.

Alternatively, in the embodiment of the application, the determination unit 610 is specifically configured to receive a first SS block in the SS block burst from the network device and determine the time-domain position of the SS block burst in the first transmission cycle based on a time-domain position of the first SS block in the first transmission cycle and the timing sequence information of the SS block in the first transmission cycle; and the first receiving unit 620 is specifically configured to receive a second SS block in the SS block burst from the network device based on the time-domain position of the SS block burst in the first transmission cycle.

Alternatively, in the embodiment of the application, the timing sequence information includes the number of time-domain units spacing any two adjacent SS blocks in the SS block burst, and the terminal device 600 further includes a fourth receiving unit 650, configured to receive indication information from the network device, the indication information indicates the number of the time-domain units; and the determination unit 610 is specifically configured to determine the time-domain position of the SS block burst in the first transmission cycle based on the time-domain position of the first SS block in the first transmission cycle and the number of the time-domain units.

Alternatively, in the embodiment of the application, the terminal device 600 further includes the fourth receiving unit 650, configured to receive the indication information from the network device, the indication information indicates the number of the SS block burst; and the determination unit 610 is specifically configured to determine the time-domain position of the SS block burst in the first transmission cycle based on the number of the SS block burst.

Alternatively, in the embodiment of the application, the terminal device 600 further includes the fourth receiving unit 650, configured to receive the indication information from the network device, the indication information indicates the time-domain position of the SS block burst in the first transmission cycle; and the determination unit 610 is specifically configured to determine the time-domain position of the SS block burst in the first transmission cycle based on the indication information.

Alternatively, in the embodiment of the application, the terminal device 600 further includes the fourth receiving unit 650, configured to receive the indication information from the network device, the indication information indicates a first correspondence in multiple correspondences, and the correspondences are mappings of timing sequences of the SS blocks in the burst in the first transmission cycle; and the determination unit 610 is specifically configured to determine the time-domain position of the SS block burst in the first transmission cycle based on the first correspondence.

Alternatively, in the embodiment of the application, the indication information is carried in at least one of the broadcast message, the system message, the RRC signaling, MAC CE signaling and DCI.

Alternatively, in the embodiment of the application, the fourth receiving unit 650 is specifically configured to receive the indication information from the network device on a primary carrier.

Alternatively, in the embodiment of the application, the primary carrier is a carrier in an NR or LTE system.

Alternatively, in the embodiment of the application, the SS block includes a PSS and an SSS.

Alternatively, in the embodiment of the application, the SS block further includes a PBCH and a DMRS for demodulating the PBCH.

It is to be understood that the terminal device 600 based on the embodiment of the application may correspond to the terminal device in the method 200 of the application and the above mentioned and other operations and/or functions of each unit in the terminal device 600 are adopted to implement the corresponding flows executed by the terminal device in the method in FIG. 6 respectively and will not be elaborated herein for simplicity.

Figure 14:
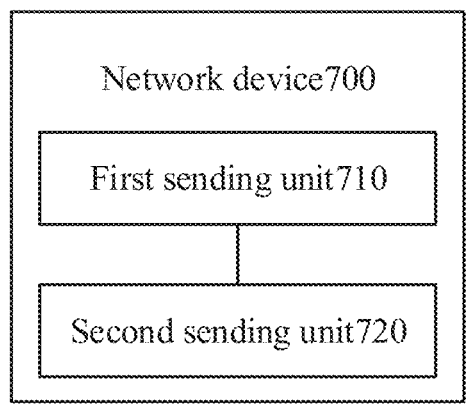
FIG. 14 illustrates a schematic block diagram of a network device based on an embodiment of the application.

FIG. 14 illustrates a schematic block diagram of a network device 700 according to an embodiment of the application. As illustrated in FIG. 14, the network device 700 includes a first sending unit 710 and a second sending unit 720.

The first sending unit 710 is configured to send indication information to a terminal device. The indication information is used for the terminal device to determine a timing sequence of each of multiple SS blocks in a first cycle.

The second sending unit 720 is configured to send each of the multiple SS blocks to the terminal device based on the timing sequence of the respective SS block in the first cycle.

In such a manner, the network device of the embodiment of the application indicates the timing sequences of the multiple SS blocks in the cycle to the terminal device, so that the terminal device can greatly reduce calculation complexity, reduce detection time and reduce power consumption.

It is to be understood that the network device 700 according to the embodiment of the application may correspond to the network device in the method 300 of the application and the above mentioned and other operations and/or functions of each unit in the network device 700 are adopted to implement the corresponding flows executed by the network device in the method in FIG. 10 respectively and will not be elaborated herein for simplicity.

Figure 15:
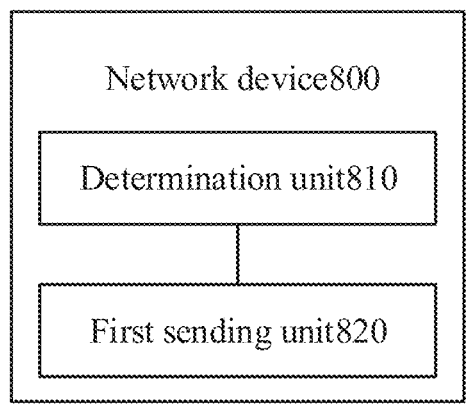
FIG. 15 is another schematic block diagram of a network device based on an embodiment of the application.

FIG. 15 illustrates a schematic block diagram of a network device 800 according to an embodiment of the application. As illustrated in FIG. 15, the network device 800 includes a determination unit 810 and a first sending unit 820.

The determination unit 810 is configured to determine a time-domain position of an SS block burst of a first cell in a first transmission cycle.

The first sending unit 820 is configured to send one or more SS blocks to a terminal device in the first cell based on the time-domain position of the SS block burst in the first transmission cycle.

In such a manner, the network device of the embodiment of the application sends the SS blocks to the terminal device at the determined time-domain position, so that the terminal device can greatly reduce calculation complexity, reduce detection time and reduce power consumption.

Alternatively, in the embodiment of the application, the determination unit 810 is specifically configured to determine the time-domain position of the SS block burst in the first transmission cycle based on a PCI of the first cell.

Alternatively, in the embodiment of the application, the determination unit 810 is specifically configured to: determine a target time-domain offset of the SS block burst relative to a first position in the first transmission cycle based on the PCI; and determine the time-domain position of the SS block burst in the first transmission cycle based on the target time-domain offset.

Alternatively, in the embodiment of the application, the determination unit 810 is specifically configured to determine the target time-domain offset based on the PCI and a mapping relationship between PCIs and time-domain offsets.

Alternatively, in the embodiment of the application, the determination unit 810 is specifically configured to determine the target time-domain offset based on the PCI and first information.

Alternatively, in the embodiment of the application, the first information is the number of the SS blocks in the burst or timing sequence information of the SS block burst in the first transmission cycle, and the determination unit 810 is specifically configured to determine the target time-domain offset based on the PCI and the number of the SS blocks in the burst, or determine the target time-domain offset based on the PCI and the timing sequence information of the SS block burst in the first transmission cycle.

Alternatively, in the embodiment of the application, the determination unit 810 is specifically configured to execute a remainder operation on the PCI and the number of the SS blocks in the burst to obtain the target time-domain offset.

Alternatively, in the embodiment of the application, the network device 800 further includes a second sending unit 830, configured to send second information to the terminal device, the second information indicates the target time-domain offset of the SS block burst in the first transmission cycle.

Alternatively, in the embodiment of the application, the second information is an ID of the target time-domain offset in multiple pre-configured time-domain offsets.

Alternatively, in the embodiment of the application, the first information and the second information are carried in a system message, a broadcast message or RRC signaling.

Alternatively, in the embodiment of the application, the network device 800 further includes a third sending unit 840, configured to send indication information to the terminal device, the indication information indicates the number of time-domain units between any two immediate adjacent SS blocks in the SS block burst.

Alternatively, in the embodiment of the application, the network device 800 further includes a third sending unit 840, configured to send indication information to the terminal device, the indication information indicates the number of the SS blocks in the burst.

Alternatively, in the embodiment of the application, the network device 800 further includes a third sending unit 840, configured to send indication information to the terminal device, the indication information indicates the time-domain position of the respective SS block burst in the first transmission cycle.

Alternatively, in the embodiment of the application, the network device 800 further includes a third sending unit 840, configured to send indication information to the terminal device, the indication information indicates a first correspondence in multiple correspondences, and the correspondences are mappings of timing sequences of the SS blocks in the burst in the first transmission cycle.

Alternatively, in the embodiment of the application, the indication information is carried in at least one of the broadcast message, the system message, the RRC signaling, MAC CE signaling, or DCI.

Alternatively, in the embodiment of the application, the third sending unit 840 is specifically configured to send the indication information to the terminal device on a primary carrier.

Alternatively, in the embodiment of the application, the primary carrier is a carrier in an NR or LTE system.

Alternatively, in the embodiment of the application, the SS block includes a PSS and an SSS.

Alternatively, in the embodiment of the application, the SS block further includes a PBCH, and a DMRS for demodulating the PBCH.

It is to be understood that the network device 800 according to the embodiment of the application may correspond to the network device in the method 400 of the application, and the above mentioned and other operations and/or functions of each unit in the network device 800 are adopted to implement the corresponding flows executed by the network device in the method in FIG. 11 respectively and will not be elaborated herein for simplicity.

Figure 16:
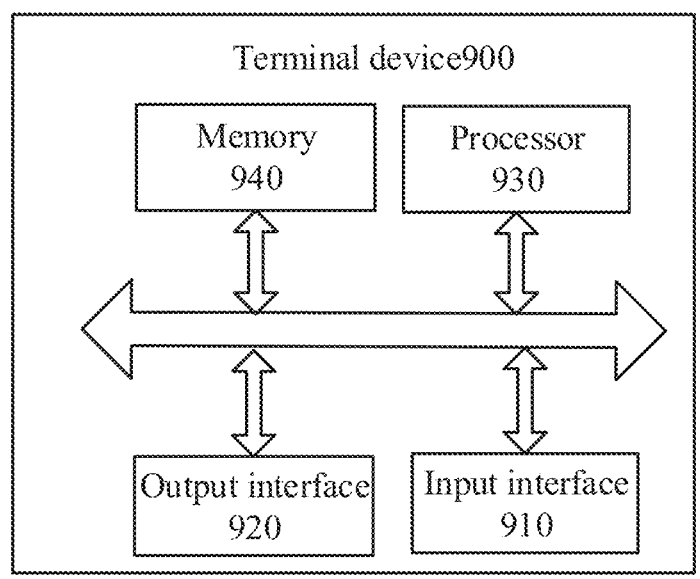
FIG. 16 is yet another schematic block diagram of a terminal device based on an embodiment of the application.

As illustrated in FIG. 16, an embodiment of the application provides a terminal device 900. The terminal device 900 may be the terminal device 500 in FIG. 12, and may be configured to execute actions of the terminal device corresponding to the method 100 in FIG. 5. The terminal device 900 includes an input interface 910, an output interface 920, a processor 930 and a memory 940. The input interface 910, the output interface 920, the processor 930 and the memory 940 may be connected through a bus system. The memory 940 is configured to store a program, instructions or a code. The processor 930 is configured to execute the program instructions or code in the memory 940 to control the input interface 910 to receive a signal, control the output interface 920 to send a signal and complete operations in the method embodiments.

In such a manner, the terminal device of the embodiment of the application may determine the timing sequences of the multiple SS blocks in the cycle in advance, and then may receive the SS blocks on fixed time-domain resources, so that the terminal device can greatly reduce calculation complexity, reduce detection time and reduce power consumption.

It is to be understood that, in the embodiment of the application, the processor 930 may be a Central Processing Unit (CPU), or the processor 930 may be another universal processor, a digital signal processor, an application specific integrated circuit, a field-programmable gate array or another programmable logic device, discrete gate or transistor logic device and discrete hardware component and the like. The universal processor may be a microprocessor, or the processor may be any conventional processor and the like.

The memory 940 may include a Read-Only Memory (ROM) and a Random Access Memory (RAM) and may provide instructions and data for the processor 930. A part of the memory 940 may further include a nonvolatile RAM. For example, the memory 940 may further store information of device types.

In an implementation process, actions of the method may be performed by an integrated logic circuit in a hardware form or instructions in a software form in the processor 930. The actions of the method disclosed in combination with the embodiments of the application may be directly executed by a hardware processor or executed by a combination of hardware and software modules in the processor. The software module may be located in a storage medium well known in this field such as a RAM, a flash memory, a ROM, a programmable ROM or electrically erasable programmable ROM and a register. The storage medium is located in the memory 940. The processor 930 reads information in the memory 940 and completes the actions of the method in combination with hardware. No more detailed description will be made herein to avoid repetitions.

In a specific implementation mode, the first receiving unit 520 in the terminal device 500 may be implemented by the input interface 910 in FIG. 16, and the determination unit 510 in the terminal device 500 may be implemented by the processor 930 in FIG. 16.

Figure 17:
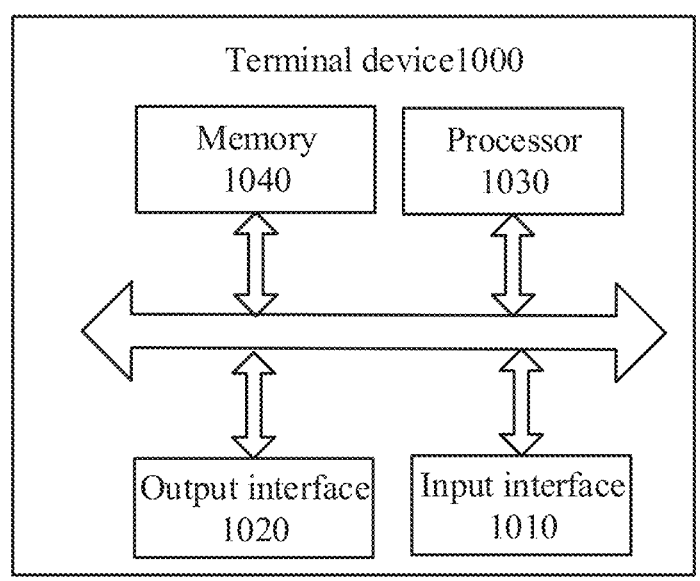
FIG. 17 is yet another schematic block diagram of a terminal device based on an embodiment of the application.

As illustrated in FIG. 17, an embodiment of the application provides a terminal device 1000. The terminal device 1000 may be the terminal device 600 in FIG. 13, and may be configured to execute actions of the terminal device corresponding to the method 200 in FIG. 6. The terminal device 1000 includes an input interface 1010, an output interface 1020, a processor 1030 and a memory 1040. The input interface 1010, the output interface 1020, the processor 1030 and the memory 1040 may be connected through a bus system. The memory 1040 is configured to store a program, instructions or a code. The processor 1030 is configured to execute the program instructions or code in the memory 1040 to control the input interface 1010 to receive a signal, control the output interface 1020 to send a signal and complete operations in the method embodiments.

In such a manner, according to the terminal device of the embodiment of the application, the terminal device may determine the time-domain position of the SS block burst of the serving cell of the terminal device in the transmission cycle in advance and then may receive the SS blocks on a fixed time-domain resource, so that the terminal device can greatly reduce calculation complexity, reduce detection time and reduce power consumption.

It is to be understood that, in the embodiment of the application, the processor 1030 may be a CPU, or the processor 1030 may be another universal processor, a digital signal processor, an application specific integrated circuit, a field-programmable gate array or another programmable logic device, discrete gate or transistor logic device and discrete hardware component and the like. The universal processor may be a microprocessor, or the processor may be any conventional processor and the like.

The memory 1040 may include a ROM and a RAM and provides instructions and data for the processor 1030. A part of the memory 1040 may further include a nonvolatile RAM. For example, the memory 1040 may further store information of device types.

In an implementation process, actions of the method may be performed by an integrated logic circuit in a hardware form or instructions in a software form in the processor 1030. The actions of the method disclosed in combination with the embodiments of the application may be directly executed by a hardware processor or executed by a combination of hardware and software modules in the processor. The software module may be located in a storage medium well known in this field such as a RAM, a flash memory, a ROM, a programmable ROM or electrically erasable programmable ROM and a register. The storage medium is located in the memory 1040. The processor 1030 reads information in the memory 1040 and completes the actions of the method in combination with hardware. No more detailed description will be made herein to avoid repetitions.

In a specific implementation mode, the first receiving unit 620, second receiving unit 630, third receiving unit 640 and fourth receiving unit 650 in the terminal device 600 may be implemented by the input interface 1010 in FIG. 17, and the determination unit 610 in the terminal device 600 may be implemented by the processor 1030 in FIG. 17.

Figure 18:
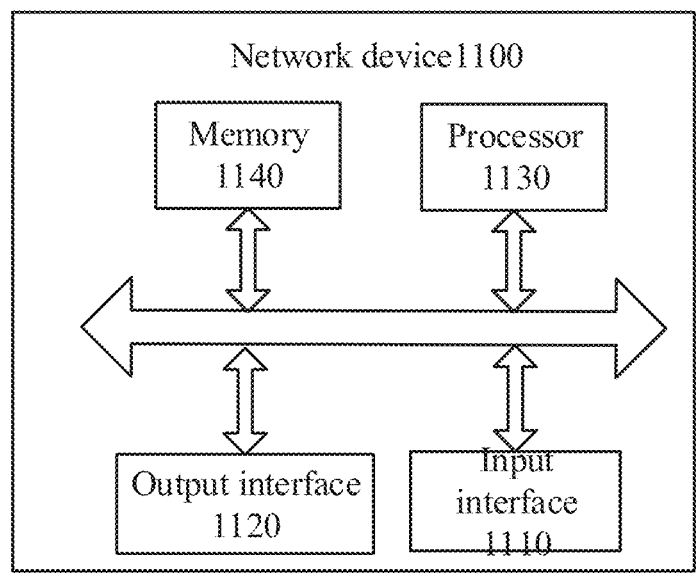
FIG. 18 is yet another schematic block diagram of a network device based on an embodiment of the application.

As illustrated in FIG. 18, an embodiment of the application provides a network device 1100. The network device 1100 may be the network device 700 in FIG. 14, and may be configured to execute actions of the network device corresponding to the method 300 in FIG. 10. The network device 1100 includes an input interface 1110, an output interface 1120, a processor 1130 and a memory 1140. The input interface 1110, the output interface 1120, the processor 1130 and the memory 1140 may be connected through a bus system. The memory 1140 is configured to store a program, instructions or a code. The processor 1130 is configured to execute the program instructions or code in the memory 1140 to control the input interface 1110 to receive a signal, control the output interface 1120 to send a signal and complete operations in the method embodiments.

In such a manner, the network device of the embodiment of the application indicates the timing sequences of the multiple SS blocks in the cycle to the terminal device, so that the terminal device can greatly reduce calculation complexity, reduce detection time and reduce power consumption.

It is to be understood that, in the embodiment of the application, the processor 1130 may be a CPU, or the processor 1130 may be another universal processor, a digital signal processor, an application specific integrated circuit, a field-programmable gate array or another programmable logic device, discrete gate or transistor logic device and discrete hardware component and the like. The universal processor may be a microprocessor, or the processor may be any conventional processor and the like.

The memory 1140 may include a ROM and a RAM, and may provide instructions and data for the processor 1130. A part of the memory 1140 may further include a nonvolatile RAM. For example, the memory 1140 may further store information of device types.

In an implementation process, actions in the method may be performed by an integrated logic circuit in a hardware form or instructions in a software form in the processor 1130. The actions of the method disclosed in combination with the embodiments of the application may be directly executed by a hardware processor or executed by a combination of hardware and software modules in the processor. The software module may be located in a storage medium well known in this field such as a RAM, a flash memory, a ROM, a programmable ROM or electrically erasable programmable ROM and a register. The storage medium is located in the memory 1140. The processor 1130 reads information in the memory 1140 and completes the actions of the method in combination with hardware. No more detailed description will be made herein to avoid repetitions.

In a specific implementation mode, the first sending unit 710 and second sending unit 720 in the network device 700 may be implemented by the output interface 1120 in FIG. 18.

Figure 19:
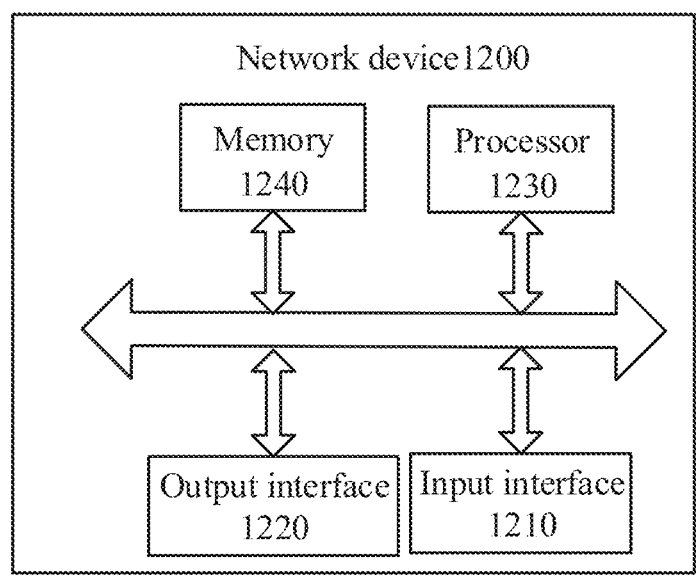
FIG. 19 is yet another schematic block diagram of a network device based on an embodiment of the application.

As illustrated in FIG. 19, an embodiment of the application also provides a network device 1200. The network device 1200 may be the network device 800 in FIG. 15, and may be configured to execute actions at the network device corresponding to the method 400 in FIG. 11. The network device 1200 includes an input interface 1210, an output interface 1220, a processor 1230 and a memory 1240. The input interface 1210, the output interface 1220, the processor 1230 and the memory 1240 may be connected through a bus system. The memory 1240 is configured to store a program, instructions or a code. The processor 1230 is configured to execute the program instructions or code in the memory 1240 to control the input interface 1210 to receive a signal, control the output interface 1220 to send a signal and complete operations in the method embodiments.

In such a manner, based on the network device of the embodiment of the application, the network device may send the SS block on a fixed time-domain resource, and then the terminal device may receive the SS block on the fixed time-domain resource, so that the terminal device can greatly reduce calculation complexity, reduce detection time and reduce power consumption.

It is to be understood that, in the embodiment of the application, the processor 1230 may be a CPU, or the processor 1230 may be another universal processor, a digital signal processor, an application specific integrated circuit, a field-programmable gate array or another programmable logic device, discrete gate or transistor logic device and discrete hardware component and the like. The universal processor may be a microprocessor, or the processor may be any conventional processor and the like.

The memory 1240 may include a ROM and a RAM, and provides instructions and data for the processor 1230. A part of the memory 1240 may further include a nonvolatile RAM. For example, the memory 1240 may further store information of device types.

In an implementation process, each content of the method may be completed by an integrated logic circuit in a form of hardware or instructions in a software form in the processor 1230. The contents of the method disclosed in combination with the embodiments of the application may be directly executed by a hardware processor or executed by a combination of hardware and software modules in the processor. The software module may be located in a storage medium well known in this field such as a RAM, a flash memory, a ROM, a programmable ROM or electrically erasable programmable ROM and a register. The storage medium is located in the memory 1240. The processor 1230 reads information in the memory 1240 and completes the contents of the method in combination with hardware. No more detailed description will be made herein to avoid repetitions.

In a specific implementation mode, the first sending unit 820, second sending unit 830 and third sending unit 840 in the network device 800 may be implemented by the output interface 1220 in FIG. 19.

An embodiment of the application also discloses a computer-readable storage medium, which stores one or more programs, the one or more programs including instructions and the instructions, when being executed by a portable electronic device including multiple application programs, cause the portable electronic device to execute the method of the embodiment illustrated in FIG. 5, FIG. 6, FIG. 10 or FIG. 11.

An embodiment of the application also discloses a computer program, which includes instructions, the computer program, when being executed by a computer, causes the computer to execute actions in the method of the embodiment illustrated in FIG. 5, FIG. 6, FIG. 10 or FIG. 11.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the application.

Those skilled in the art may understand that specific working processes of the system, device and unit described above may be seen from the corresponding processes in the method embodiment and will not be elaborated herein for convenience and simplicity of description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each illustrated or discussed component may be indirect coupling or communication connection, implemented through some interfaces, of the device or the units, and may be electrical and mechanical or adopt other forms.

The units described as separate parts may or may not be physically separated, and components illustrated as units may or may not be physical units, and namely may be located in a same place, or may be distributed among multiple network units. Some or all of the units may be selected based on a practical requirement, to achieve the purpose of the solutions of the embodiments.

In addition, the functional units in each of the embodiments of the application may be integrated into a processing unit, or the units may physically exist independently, or two or more units may be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A signal transmission method, comprising:
  determining, by a terminal device, a time-domain position of a synchronization signal (SS) block burst of a serving cell of the terminal device in a first transmission cycle; and
  receiving, by the terminal device, one or more SS blocks from a network device based on the time-domain position of the SS block burst in the first transmission cycle,
  the method further comprising:
  receiving, by the terminal device, indication information from the network device, wherein the indication information indicates a number of SS blocks in the burst,
  wherein determining, by the terminal device, the time-domain position of the SS block burst of the serving cell of the terminal device in the first transmission cycle comprises:
  determining, by the terminal device, the time-domain position of the SS block burst in the first transmission cycle based on the number of the SS blocks in the burst.

2. The method of claim 1, wherein the indication information is carried in at least one of a broadcast message, a system message, RRC signaling, media access control (MAC) control element (CE) signaling, or downlink control information (DCI).

3. The method of claim 1, wherein receiving, by the terminal device, the indication information from the network device comprises:
  receiving, by the terminal device, the indication information from the network device on a primary carrier.

4. The method of claim 3, wherein the primary carrier is a carrier in a New Radio (NR) system or a Long Term Evolution (LTE) system.

5. The method of claim 1, wherein the SS block comprises a primary synchronization signal (PSS) and a secondary synchronization signal (SSS).

6. A terminal device, comprising:
  a processor, configured to determine a time-domain position of the SS block burst of a serving cell of the terminal device in a first transmission cycle; and an input interface, configured to receive one or more SS blocks from a network device based on the time-domain position of the SS block burst in the first transmission cycle, wherein the input interface is further configured to receive indication information from the network device, wherein the indication information indicates a number of SS blocks in the burst, and wherein the processor is configured to:

determine the time-domain position of the SS block burst in the first transmission cycle based on the number of the SS blocks in the burst.

7. The terminal device of claim 6, wherein the indication information is carried in at least one of a broadcast message, a system message, RRC signaling, media access control (MAC) control element (CE) signaling, or downlink control information (DCI).

8. The terminal device of claim 6, wherein the input interface is configured to:

receive the indication information from the network device on a primary carrier.

9. The terminal device of claim 8, wherein the primary carrier is a carrier in a New Radio (NR) system or a Long Term Evolution (LTE) system.

10. The terminal device of claim 6, wherein the SS block comprises a primary synchronization signal (PSS) and a secondary synchronization signal (SSS).

* * * * *